(12) United States Patent
Al-Khatib

(10) Patent No.: US 6,512,799 B2
(45) Date of Patent: Jan. 28, 2003

(54) DIGITAL COMMUNICATION SYSTEM AND METHOD FOR INCREASED BIT RATES

(75) Inventor: Mazeb Al-Khatib, Mobile, AL (US)

(73) Assignee: University of South Alabama, Mobile, AL (US)

( * ) Notice: Subject to any disclaimer, the term of this patent is extended or adjusted under 35 U.S.C. 154(b) by 0 days.

(21) Appl. No.: 09/776,886

(22) Filed: Feb. 6, 2001

(65) Prior Publication Data
US 2002/0146079 A1 Oct. 10, 2002

(51) Int. Cl.[7] ................................................. H04L 5/12
(52) U.S. Cl. .................. 375/261; 375/269; 375/279; 375/298; 375/300; 375/308; 375/324; 375/329; 375/340; 332/103; 332/145; 329/306; 329/346; 329/358; 455/93; 455/108; 455/110; 455/131; 455/205
(58) Field of Search ................. 375/269, 279, 375/282, 283, 298, 300, 308, 324, 329–331, 340, 214, 219, 239, 261, 268, 273, 274, 280, 281, 285, 320; 341/53, 58, 59, 70, 71; 332/144–147, 103–105; 329/304, 306, 345–347, 358; 455/93, 108–110, 130, 131, 203–205

(56) References Cited

U.S. PATENT DOCUMENTS

| | | | |
|---|---|---|---|
| 3,947,769 A | 3/1976 | Rousos et al. | 325/320 |
| 3,953,798 A | 4/1976 | Sjostrand et al. | 325/30 |
| 4,471,312 A | 9/1984 | Severin | 329/103 |
| 4,497,060 A | * 1/1985 | Yang | 329/312 |
| 4,704,582 A | * 11/1987 | Dixon et al. | 329/308 |
| 4,922,206 A | * 5/1990 | Nicholas | 329/304 |
| 5,241,562 A | 8/1993 | Partyka et al. | 375/1 |
| 5,303,265 A | 4/1994 | McLean | 375/17 |
| 5,640,160 A | 6/1997 | Miwa | 341/53 |
| 5,815,531 A | * 9/1998 | Dent | 332/103 |
| 5,917,613 A | 6/1999 | Miller | 358/442 |
| 5,930,303 A | 7/1999 | Walker | 375/301 |
| 5,975,531 A | 11/1999 | Rebec et al. | 275/240 |

(List continued on next page.)

OTHER PUBLICATIONS

PCT International Search Report, PCT/US02/01954, May 20, 2002, 4 pgs.

Primary Examiner—Stephen Chin
Assistant Examiner—Dac V. Ha
(74) Attorney, Agent, or Firm—Sterne, Kessler, Goldstein & Fox P.L.L.C.

(57) ABSTRACT

A digital communication system and method is provided for increasing bit-rates while maintaining the reliability of transmitted digital information and avoiding increased power demands. The communication system includes a transmitter that modulates one or more bits onto a carrier signal to generate and transmit a first transmission signal during the first part of a pulse time $T_B$, receives an additional bit, and based on the value of the additional bit, either transmits the first transmission signal again during the second part of the pulse time $T_B$ or transmits a second transmission signal during the second part of the pulse time $T_B$. The communication system also includes a receiver that receives a transmission signal, demodulates the transmission signal during the first part of a pulse time $T_B$ to determine a value for one or more received bits, accumulates a voltage from the transmission signal during the second part of the pulse time $T_B$ to generate an accumulated voltage, measures the accumulated voltage, and assigning either a first value or second value to an additional received bit based on the value of the accumulated voltage.

22 Claims, 17 Drawing Sheets

U.S. PATENT DOCUMENTS

| | | | |
|---|---|---|---|
| 6,005,876 A | 12/1999 | Cimini, Jr. et al. | 370/525 |
| 6,014,093 A | 1/2000 | Hayes | 341/53 |
| 6,014,366 A | 1/2000 | Ichiyoshi | 370/210 |
| 6,018,547 A | 1/2000 | Arkhipkin et al. | 375/208 |
| 6,020,834 A | 2/2000 | Rider | 341/53 |
| 6,020,839 A | 2/2000 | Thornton | 341/155 |
| 6,064,697 A | 5/2000 | Yoshikawa | 375/242 |
| 6,094,238 A | 7/2000 | Shafer | 348/734 |
| 6,097,766 A | 8/2000 | Okubo et al. | 375/324 |
| 6,108,377 A | 8/2000 | Sass et al. | 375/239 |

\* cited by examiner

FIG. 2
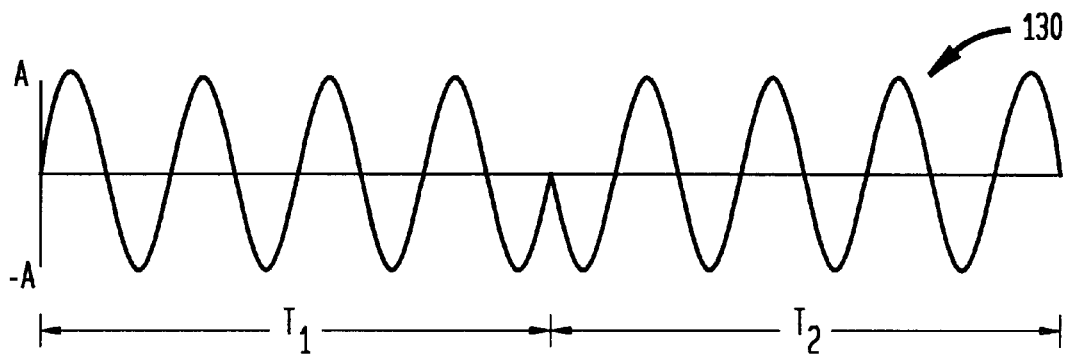
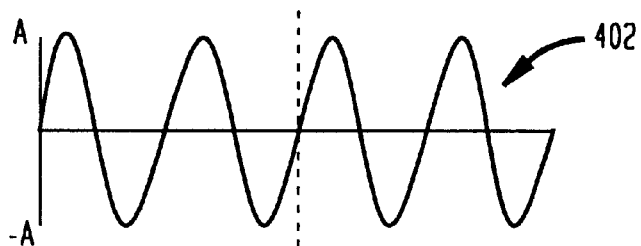
FIG. 4A
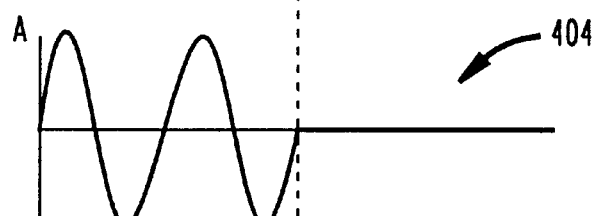
FIG. 4B
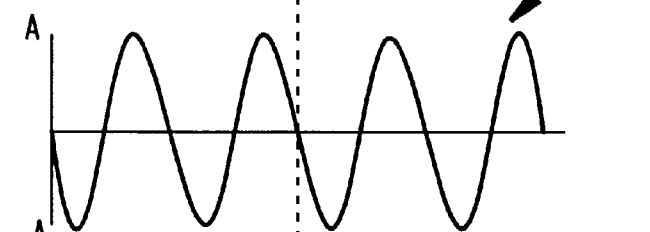
FIG. 4C
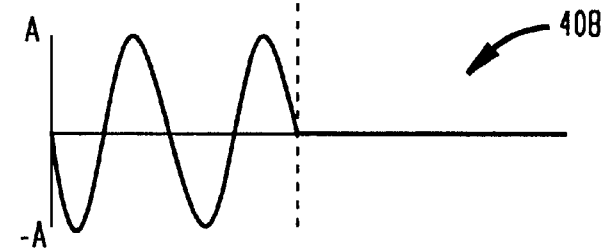
FIG. 4D

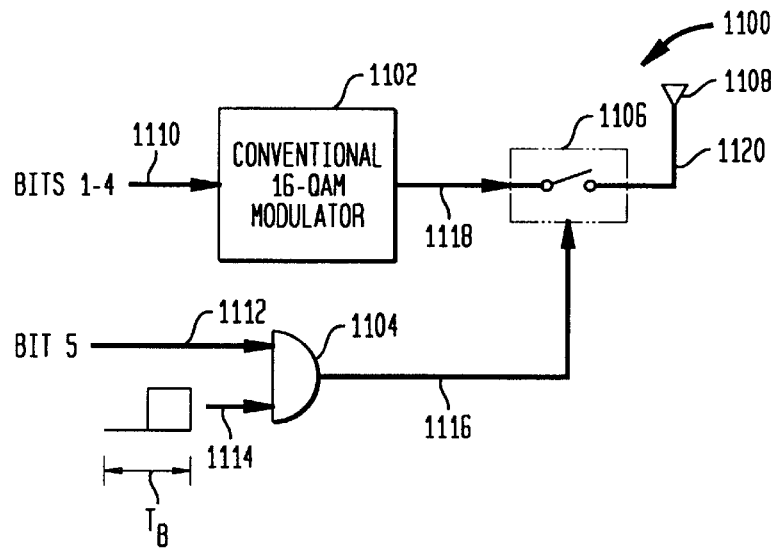
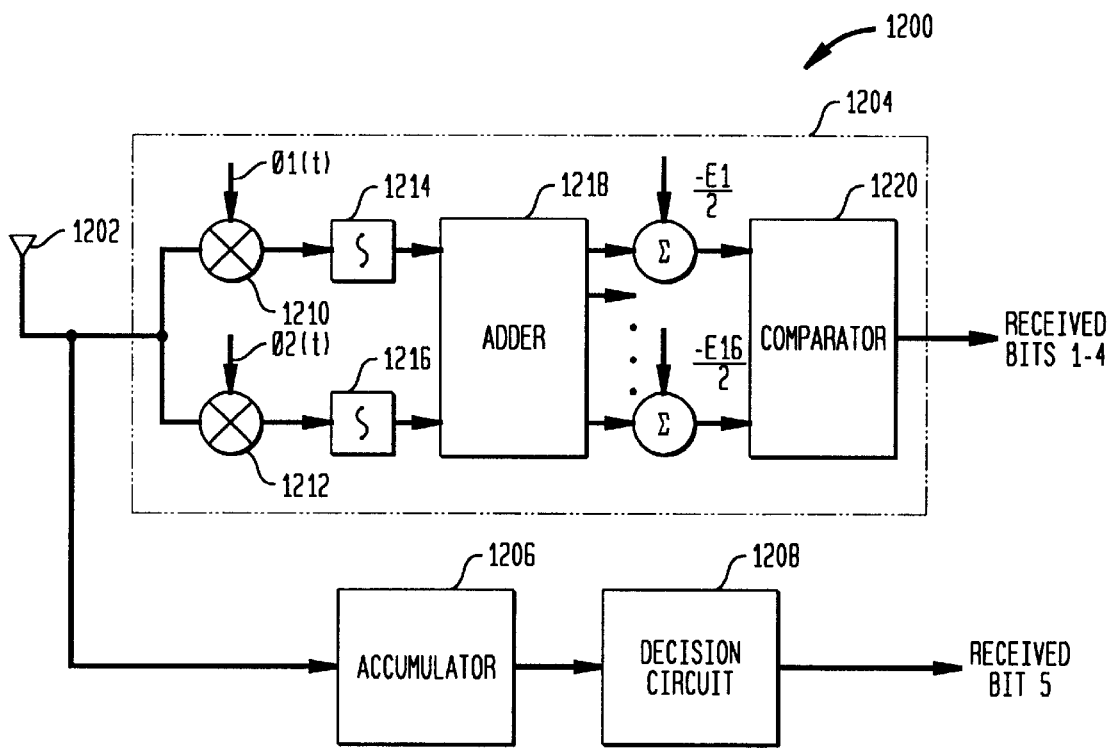

DIGITAL COMMUNICATION SYSTEM AND METHOD FOR INCREASED BIT RATES

CROSS-REFERENCE TO RELATED APPLICATIONS

Not applicable.

STATEMENT REGARDING FEDERALLY-SPONSORED RESEARCH AND DEVELOPMENT

Not applicable.

REFERENCE TO MICROFICHE APPENDIX/SEQUENCE LISTING/TABLE/COMPUTER PROGRAM LISTING APPENDIX (Submitted on a Compact Disc and an Incorporation-by-reference of the Material on the Compact Disc)

Not applicable.

BACKGROUND OF THE INVENTION

1. Field of the Invention

The present invention relates to a system and method for the communication of digital information. More specifically, the present invention relate s to a modulation and demodulation system and method for the communication of bits of digital information.

2. Background Art

Technologies that rely upon the high-speed transfer of digital information are growing rapidly. The growth of these technologies has been accompanied by the concomitant need for faster digital transmission rates. For example, development in the areas of digital networking and telecommunications have created a desire for increased digital transmission rates to accommodate the rapid transfer of increasingly larger amounts of digital information.

Wireless technologies in particular may require the high-speed transmission of digital data. For example, there is a considerable need for devices that provide for wireless high-speed digital communication to connect different clusters of networks together. To satisfy this need, some companies have manufactured high speed point-to-point transceivers using advanced digital modulation techniques such as 16- or 64-Quadrature Amplitude Modulation (QAM), and M-ary Phase-Shift Keying (PSK).

Current digital modulation techniques are limited, however, in that an increase in the transmission bit rate often results in a decrease in the overall reliability of transmitted data and/or a required increase in the power of the transmitted signal.

For example, conventional Binary PSK (BPSK) systems transmit one bit per pulse. In one embodiment of a conventional BPSK system, a pulse phase of 0° will correspond to a bit value of 0 and a pulse phase of 180° will correspond to a bit value of 1. The customary technique for doubling the bit rate of such a BPSK system is to increase the number of phase shifts available for the pulses from two (0° and 180°) to four (0°, 90°, 180° and 270°), thus permitting two bits to be transferred per pulse as opposed to a single bit. However, it has been observed that increasing the number of available phase shifts (and hence the number of bits that may be transferred per pulse) has resulted in a higher probability of bit errors upon reception of a transmitted signal. To avoid this inherent decrease in reliability, the power of the transmitted signal must be increased, which has the undesired effect of increasing the size, complexity and cost of digital communication components.

A similar limitation has been observed in conventional QAM systems. A conventional QAM modulation technique combines phase and amplitude modulation to transfer two bits per pulse time, $T_b$. To increase the transmission rate to four bits per pulse time $T_b$, 16-QAM can be used. In 16-QAM, four amplitude levels and two phase shifts are used, resulting in 16 different phase/amplitude combinations for encoding four bits of data. When 64-QAM is used, 6 bits may be represented per pulse by increasing the number of amplitude levels from four to eight. While increasing the number of amplitude levels in QAM modulation permits an increased bit rate, the increase also results in a higher probability of bit errors upon reception. To maintain a consistent level of reliability, more transmission power is required at higher bit rates. If the power level is not increased, then the probability of bit errors will be higher.

What is needed, then, is a novel modulation and demodulation system and method for communicating digital information that provides for an increased bit rate without a corresponding loss in reliability of the transmitted information, and without a need for increased transmission power.

BRIEF SUMMARY OF THE INVENTION

The present invention is directed to a communication system and method for increasing the transfer rate of digital information. According to the present invention, a method for transmitting digital information is provided that includes receiving one or more bits, modulating the one or more bits onto a carrier signal to generate a first transmission signal during a first part of a pulse time $T_B$, receiving an additional bit, determining whether the additional bit is a first value or a second value, transmitting the first transmission signal during a second part of the pulse time $T_B$ if the additional bit is the first value, and transmitting a second transmission signal during the second part of the pulse time $T_B$ if the additional bit is a second value.

A method for receiving digital information in accordance with the present invention is also provided that includes receiving a transmission signal, demodulating the transmission signal during a first part of a pulse time $T_B$ to determine a value for one or more received bits, accumulating a voltage from the transmission signal during a second part of the pulse time $T_B$ to generate an accumulated voltage, measuring the accumulated voltage, assigning a first value to an additional received bit if the accumulated voltage is within a first voltage range, and assigning a second value to the additional received bit if the accumulated voltage is within a second voltage range.

A transmitter for transmitting digital information in accordance with the present invention comprises a modulator for receiving one or more bits and modulating the one or more bits onto a carrier signal to generate a first transmission signal, control logic for receiving an additional bit and determining whether the additional bit is a first value or a second value, a transmitter antenna, and a switch, wherein the switch is controlled by the control logic to couple the first transmission signal to the transmitter antenna during a first part of a pulse time $T_B$, and wherein the switch is controlled by the control logic to couple the first transmission signal to the transmitter antenna during a second part of the pulse time $T_B$ when the additional bit is the first value and to couple a second transmission signal to the transmitter antenna during the second part of the pulse time $T_B$ when the additional bit is the second value.

A receiver for receiving digital information in accordance with the present invention comprises a receiver antenna for receiving a transmission signal, a demodulator for demodulating the transmission signal during a first part of a pulse time $T_B$ to determine a value for one or more received bits, an accumulator for accumulating a voltage from the transmission signal during a second part of the pulse time $T_B$ to generate an accumulated voltage, and a decision circuit for measuring the accumulated voltage, wherein the decision circuit assigns a first value to an additional received bit if the accumulated voltage is within a first voltage range and assigns a second value to the additional received bit if the accumulated voltage is within a second voltage range.

The invention is advantageous in that it provides an increased transfer rate of digital information without impairing the reliability of the transmission.

The invention is also advantageous in that it provides an increased transfer rate of digital information while also improving the reliability of the transmission.

A further advantage of the invention is that it provides an increased transfer rate of digital information while requiring less power than conventional digital communication systems and methods that provide comparable transfer rates.

Another benefit of the invention is that it may be implemented in conjunction with any existing digital modulation and demodulation technique to improve transfer rate and transmission reliability.

Yet another benefit of the invention is that it may be implemented in conjunction with M-ary PSK digital modulation and demodulation techniques to improve transfer rate and transmission reliability.

A further advantage of the invention is that it may be implemented in conjunction with QAM, 16-QAM and 64-QAM digital modulation and demodulation techniques to improve transfer rate and transmission reliability.

A further benefit of the invention is that it provides a low-cost solution for improving the transfer rate of a digital communication system.

Another benefit of the invention is that it can be easily implemented in conjunction with existing digital communication components to improve system performance.

Additional features and advantages of the invention will be set forth in the description that follows, and in part will be apparent from the description, or may be learned by practice of the invention. The objectives and other advantages of the invention will be realized and attained by the system and method particularly pointed out in the written description and claims hereof as well as the appended drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 2 illustrates a transmitted output signal from the transmitter portion of a conventional BPSK modulation/demodulation system.

FIGS. 4A–4D illustrate transmitted output signals from the transmitter portion of a BPSK-based modulation/demodulation system in accordance with an embodiment of the present invention.

FIG. 11 is a functional diagram of the transmitter portion of a 16-QAM-based modulation/demodulation system in accordance with an embodiment of the present invention.

FIG. 12 is a functional diagram of the receiver portion of a 1 6-QAM-based modulation/demodulation system in accordance with an embodiment of the present invention.

Figure 1:
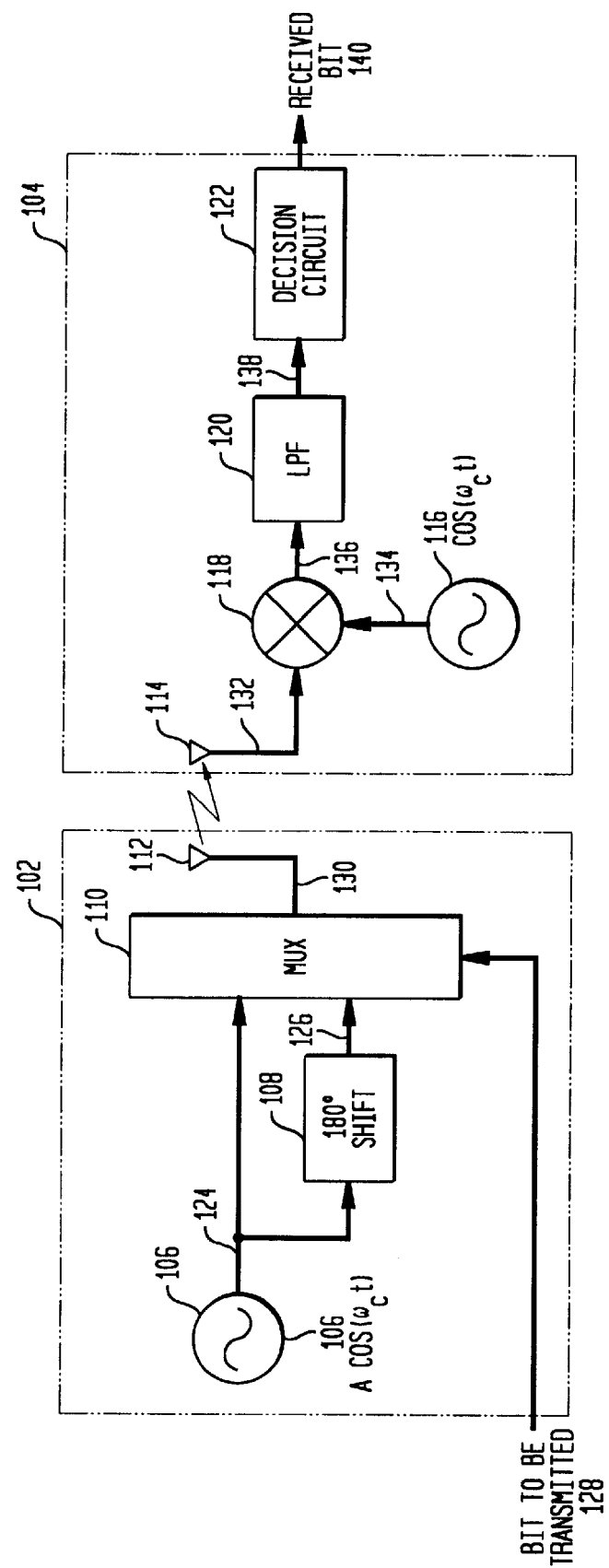
FIG. 1 is a functional diagram of a conventional BPSK modulation/demodulation system.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Table of Contents

A. Conventional BPSK Modulation/Demodulation System

B. BPSK-based Modulation/Demodulation System in Accordance with an Embodiment of the Present Invention C. 16-QAM-based Modulation/Demodulation System in Accordance with an Embodiment of the Present Invention D. Alternate Modulation/Demodulation Systems in Accordance with an Embodiment of the Present Invention E. Conclusion

A. Conventional BPSK Modulation/Demodulation System

FIG. 1 is a high-level functional diagram of an exemplary conventional BPSK modulation/demodulation system 100, which is described herein to provide a better understanding of the present invention. The conventional BPSK modulation/demodulation system 100 is comprised of a transmitter portion 102 and a receiver portion 104.

The transmitter portion 102 modulates a bit to be transmitted onto an oscillating carrier signal according to a conventional BPSK modulation technique and transmits the modulated signal.

The transmitter portion 102 is comprised of a signal generator 106, a phase shifter 108, a multiplexer 110, and a transmitter antenna 112. The signal generator 106 generates an oscillating signal 124 with a voltage that oscillates according to the function $A \cos(\omega_c t)$. For the purposes of this example, we will assume that the oscillating signal 124 generated by signal generator 106 has a phase of 0°. The oscillating signal 124 is received by both the phase shifter 108 and the multiplexer 110. The phase shifter 108 receives the oscillating signal 124 and shifts it 180° to generate a phase-shifted oscillating signal 126 with a phase of 180°. In other words, the phase shifter 108 generates an oscillating signal with a voltage that oscillates according to the function $A \cos(\omega_c t - 180)$, which may also be quantified as $-A \cos(\omega_c t)$. The phase-shifted oscillating signal 126 is also received by the multiplexer 110.

The bit to be transmitted 128 is received by the multiplexer 110 and is used by the multiplexer 110 to determine whether to output the oscillating signal 124 or the phase-shifted oscillating signal 126. In the example conventional BPSK transmitter portion 102, if the value of the bit to be transmitted 128 is zero, then the multiplexer 110 will output the oscillating signal 124 with a phase of 0° and if the value of the bit to be transmitted 128 is one, then the multiplexer 110 will output the phase-shifted oscillating signal 126 with a phase of 180°. In this way, the multiplexer 110 generates an output signal 130 which is essentially the oscillating signal 124 phase-modulated by the bit to be transmitted 128. The output signal 130 is then transmitted via the transmitter antenna 112.

The transmitter portion 102 is thus capable of transmitting one bit per pulse time $T_b$. This is further demonstrated by FIG. 2, which depicts the output signal 130 generated by the transmitter portion 102 upon receiving the consecutive bit values of 0 and 1 for transmission. As shown in FIG. 2, the output signal 130 has a phase of 0° during the first pulse time $T_1$, corresponding to the 0 value of the first bit to be transmitted, and a phase of 180° during the second pulse time $T_2$, corresponding to the 1 value of the second bit to be transmitted.

With further reference to FIG. 1, the receiver portion 104 receives the phase-modulated output signal from the transmitter portion 102 and demodulates the phase-modulated signal according to a conventional BPSK demodulation technique to recover the transmitted bit.

The receiver portion 104 includes a receiver antenna 114, a signal generator 116, a multiplier 118, a low pass filter 120, and a decision circuit 122. The receiver antenna 114 receives the phase-modulated output signal from the transmitter portion 102 as input signal 132. As discussed above, the input signal 132 is either $A \cos(\omega_c t)$ or $-A \cos(\omega_c t)$, depending on the value of the transmitted bit. The input signal 132 is provided to the multiplier 118 along with an oscillating signal 134 generated by the signal generator 116. The oscillating signal 134 has a voltage that oscillates according to the function $\cos(\omega_c t)$. The multiplier 118 multiplies the input signal 132 by the oscillating signal 134 to generate a multiplied input signal 136.

The multiplied input signal 136 is either $A \cos^2(\omega_c t)$ or $-A \cos^2(\omega_c t)$, depending on the value of the input signal 132. Mathematically, the signal $A \cos^2(\omega_c t)$ may also be quantified as $A/2 + A/2 \cos(2\omega_c t)$ and the signal $-A \cos^2(\omega_c t)$ may also be quantified as $-A/2 - A/2 \cos(2\omega_c t)$. The multiplied input signal 136 is then received by the low pass filter 120 which suppresses the high frequency component of the multiplied signal 136 to generate a filtered input signal 138 which will either have a value of $A/2$ or $-A/2$.

The filtered input signal 138 is then passed to the decision circuit 122 which decides if the filtered input signal 138 represents a 0 bit or a 1 bit by comparing the filtered input signal 138 to a predetermined threshold voltage. In the example conventional BPSK receiver portion 104, the predetermined threshold voltage is zero volts. Therefore, if the filtered input signal 138 has a value greater than zero volts, then the decision circuit 122 will decide that it corresponds to a bit value of zero. Conversely, if the filtered input signal 138 has a value less than zero volts, then the decision circuit will decides that it corresponds to a bit value of one. The bit value selected by the decision circuit 122 is output as the received bit 140.

The conventional BPSK receiver portion 104 is thus capable of recovering one bit per pulse time $T_b$. This may be further understood with reference to FIG. 2, which depicts two pulses of the output signal 130 generated by the conventional BPSK transmitter 102 corresponding to pulse times $T_1$ and $T_2$. We may assume that the receiver portion 104 receives the output signal 130 as input signal 132. The multiplier 118 multiplies the first pulse, which has a value of $A \cos(\omega_c t)$, by the value $\cos(\omega_c t)$ to generate a multiplied signal 136 with a value of $A/2 + A/2 \cos(2\omega_c t)$. The multiplied signal 136 is then passed through low pass filter 120 which filters out the high frequency component to generate a filtered input signal 138 with a value of $A/2$. The decision circuit 122 receives the filtered input signal 138 and, because the filtered input signal 132 has a value that is greater than the threshold voltage of zero volts, the decision circuit 122 outputs a received bit 140 with a value of zero.

The multiplier 118 subsequently receives and multiplies the second pulse, which has a value of $-A \cos(\omega_c t)$, by the value $\cos(\omega_c t)$ to generate a multiplied signal 136 with a value of $-A/2 - A/2 \cos(2\omega_c t)$. The multiplied signal 136 is then passed through low pass filter 120 which filters out the high frequency component to generate a filtered input signal 138 with a value of $-A/2$. The decision circuit 122 receives the filtered input signal 138 and, because the filtered input signal 132 has a value that is less than the threshold voltage of zero volts, the decision circuit 122 outputs a received bit 140 with a value of one.

The conventional BPSK modulation/demodulation system 100 is limited in that it can only transmit and receive one bit per pulse. The conventional approach to increasing the bit rate for this system would be to modify the transmitter portion 102 to increase the number of phase shifts applied to the oscillating signal 124 and to modify the receiver portion to discriminate between signals of more than two phases. For example, if two bits were to be represented per pulse rather than one, a conventional approach would require modifying the transmitter portion 102 to increase the number of phase shifts applied to the oscillating signal 124 from two to four. Thus, rather than generating an output signal 130 with either a phase of 0° and 180°, the modified transmitter would need to generate an output signal with, for example, a phase of 0°, 90°, 180° and 270°. Furthermore, the receiver portion 104 would need to be modified to discriminate between the increased number of signal phases. These modifications would add significant complexity to the design of the conventional BPSK modulation/demodulation system 100 and thereby increase the cost of manufacturing such a system.

Additionally, it has been observed that increasing the number of phase shifts will result in a higher probability of bit errors in the receiver. To avoid this increase in bit errors, the power of the transmitted signal must be increased, which will also add to the cost and complexity of the system.

Figure 3:
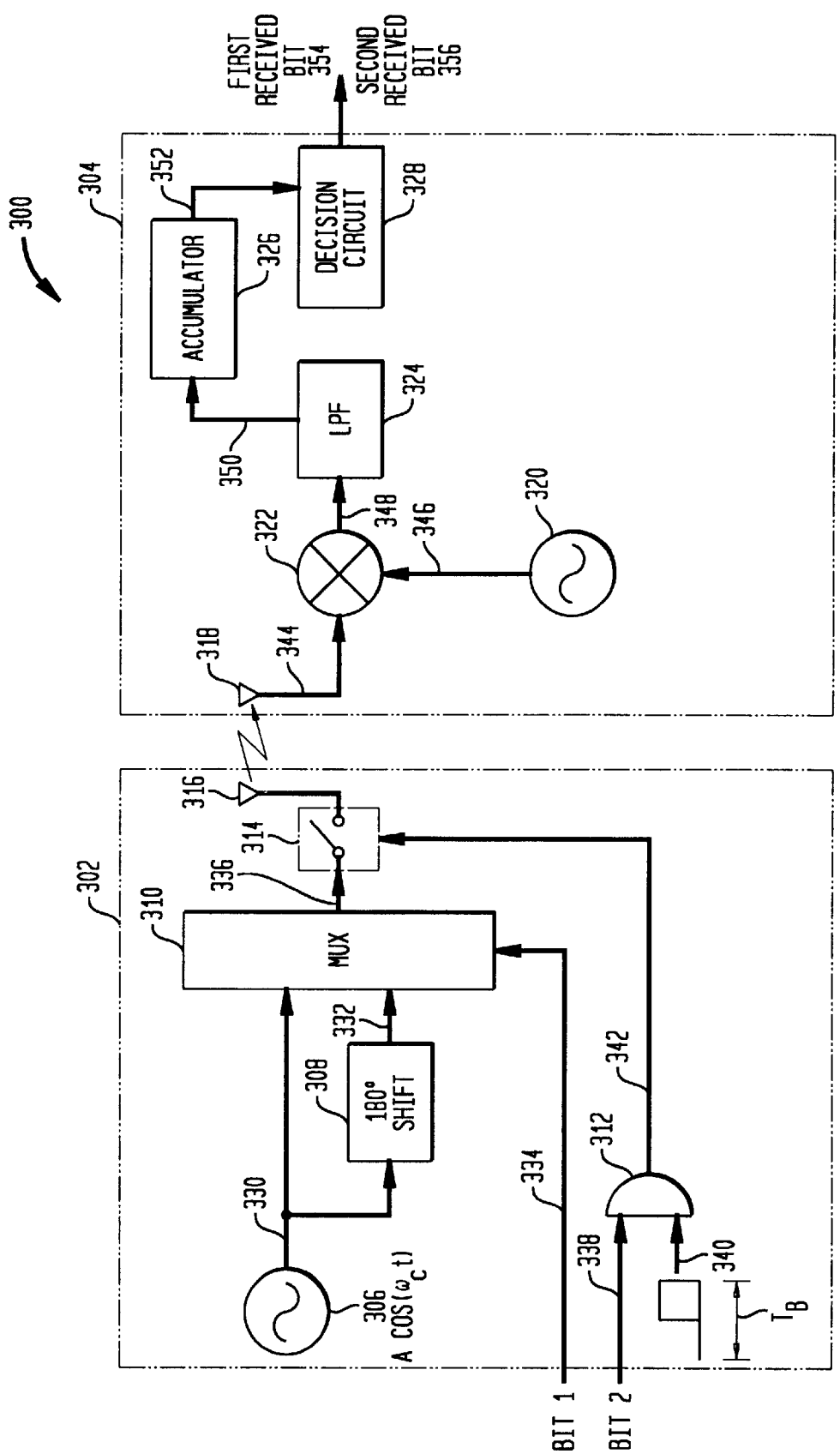
FIG. 3 is a functional diagram of a BPSK-based modulation/demodulation system in accordance with an embodiment of the present invention.

B. BPSK-based Modulation/Demodulation System in Accordance with an Embodiment of the Present Invention A BPSK-based modulation/demodulation system in accordance with the present invention permits an increased bit rate per pulse time $T_b$ as compared to the conventional BPSK modulation/demodulation system 100, but will not result in an associated increase in bit errors and also will not require an increase in the power of the transmitted signal.

functional block diagram of a BPSK-based modulation/demodulation system 300 in accordance with the present invention is depicted in FIG. 3. The BPSK-based modulation/demodulation system 300 includes a transmitter portion 302 and a receiver portion 304.

The transmitter portion 302 modulates two bits to be transmitted onto an oscillating carrier signal in accordance with a BPSK-based modulation system and method of the present invention and transmits the modulated signal.

The transmitter portion 302 includes a signal generator 306, a phase shifter 308, a multiplexer 310, an AND gate 312, a switch 314, and a transmitter antenna 316. The signal generator 306 generates an oscillating signal 330 with a voltage that oscillates according to the function $A \cos(\omega_c t)$. The oscillating signal 330 generated by signal generator 306 has a phase of 0°. The oscillating signal 330 is received both by the phase shifter 308 and the multiplexer 310. The phase shifter 308 receives the oscillating signal 330 and shifts it 180° to generate a phase-shifted oscillating signal 332 with a phase of 180°. In other words, the phase shifter 308 generates an oscillating signal with a voltage that oscillates according to the function $A \cos(\omega_c t - 180)$, which may also be quantified as $-A \cos(\omega_c t)$. The phase-shifted oscillating signal 332 is also received by the multiplexer 110.

The transmitter portion 302 transmits two bits per pulse time $T_b$. The first bit to be transmitted 334 is received by the multiplexer 310 and is used by the multiplexer 310 to determine whether to output the oscillating signal 330 or the phase-shifted oscillating signal 332. If the value of the first bit to be transmitted 334 is zero, for example, then the multiplexer 310 will output the oscillating signal 330 with a phase of 0°. However, if the value of the first bit to be transmitted 334 is one, then the multiplexer 310 will output the phase-shifted oscillating signal 332 with a phase of 180°. In this way, the multiplexer 310 generates an output signal 336 which is essentially the oscillating signal 330 phase-modulated by the first bit to be transmitted 334.

The second bit to be transmitted 338 is input to the AND gate 312. The other input to the AND gate 312 is a signal 340 that is clocked low during a first part of a pulse time $T_b$ and clocked high during a second part of the pulse time $T_b$. As a result, during the first part of the pulse time $T_b$, the output of the AND gate 312 will always be low, while during the second part of the pulse time $T_b$ the output of the AND gate 312 will either be high, if the second bit to be transmitted 338 is a one, or low, if the second bit to be transmitted 338 is a zero.

The output of the AND gate 312 is a control signal 342 that controls the switch 314. When closed, the switch 314 couples the output signal 336 from the multiplexer 308 to the transmitter antenna 316. The control signal 342 causes the switch 314 to open when the control signal 342 is high and to close when the control signal 342 is low. When the switch 314 is open, no signal is transmitted over the transmitter antenna 316. When the switch 314 is closed, the output signal 336 from the multiplexer 310 will be transmitted via the transmitter antenna 316.

The above-described configuration of the transmitter portion 302 has the effect of dividing the transmission pulse time $T_b$ into two parts. During the first part of the pulse time $T_b$, the first bit to be transmitted 334 is transmitted in accordance with the conventional BPSK modulation technique described above in regard to the BPSK system of FIG. 1. Thus, if the first bit to be transmitted 334 is a zero, then an output signal 336 of phase 0° will be transmitted during the first part of the pulse time $T_b$. However, if the first bit to be transmitted 334 is a one, then an output signal 336 of phase 180° will be transmitted during the first part of the pulse time $T_b$.

The shape of the signal transmitted during the second part of the pulse time $T_b$ is then determined based on the value of the second bit to be transmitted 338. For example, if the second bit to be transmitted 338 is a zero, then the shape of the transmitted signal during the second part of the pulse time $T_b$ will be the same as the signal transmitted during the first part of the pulse time $T_b$. That is to say, if the value of the second bit to be transmitted 338 is zero, then the shape of the transmitted signal is held constant throughout the first and second parts of the pulse time $T_b$. However, if the value of the second bit to be transmitted 338 is a one, then the switch 314 will be open during the second part of the pulse time $T_b$ and the transmitted signal during the second part of the pulse time $T_b$ will be forced to zero.

FIGS. 4A–4D depict four different transmission signals that may be generated during a pulse time $T_b$ in accordance with the above-described modulation system and method. For example, FIG. 4A depicts a signal 402 that results where the first bit to be transmitted 334 and the second bit to be transmitted 338 are both zero. In accordance with this modulation system and method, an oscillating signal with a phase of 0° corresponding to the value of the first bit to be transmitted 334 is transmitted during the first part of the pulse time $T_b$. Then, because the second bit to be transmitted 338 is a zero, a signal of the same shape is transmitted during the second part of the pulse time $T_b$. In other words, the transmission signal 402 is held constant during the first and second parts of the pulse time $T_b$.

FIG. 4B depicts a transmission signal 404 that results where the first bit to be transmitted 334 is a zero and the second bit to be transmitted 338 is a one. Here, as in FIG. 4A, an oscillating signal with a phase of 0° corresponding to the value of the first bit to be transmitted 334 is transmitted during the first part of the pulse time $T_b$. However, because the second bit to be transmitted 338 is a one, the transmitted signal 404 is forced to 0 volts during the second part of the pulse time $T_b$.

FIG. 4C depicts a transmission signal 406 that results where the first bit to be transmitted 334 is a one and the second bit to be transmitted 338 is a zero. In accordance with this modulation system and method, an oscillating signal with a phase of 180° corresponding to the value of the first bit to be transmitted 334 is transmitted during the first part of the pulse time $T_b$. Then, because the second bit to be transmitted 338 is a zero, a signal of the same shape is transmitted during the second part of the pulse time $T_b$. In other words, the transmission signal 406 is held constant during the first and second parts of the pulse time $T_b$.

Finally, FIG. 4D depicts a transmission signal 408 that results where the first bit to be transmitted 334 and the second bit to be transmitted 338 are both equal to one. Here as in FIG. 4C, an oscillating signal with a phase of 180° corresponding to the value of the first bit to be transmitted is transmitted during the first part of the pulse time $T_b$. However, because the second bit to be transmitted 338 is a one, the transmitted signal 408 is forced to 0 volts during the second part of the pulse time $T_b$.

With further reference to FIG. 3, the receiver portion 304 of the BPSK-based modulation/demodulation system 300 receives the transmitted signal from the transmitter portion 304 and demodulates the signal to recover two bits per pulse time $T_b$.

The receiver portion 304 includes a receiver antenna 318, a signal generator 320, a multiplier 322, a low pass filter 324, an accumulator 326, and a decision circuit 328. The receiver antenna 318 receives the transmitted signal from the transmitter portion 302 as input signal 344. As discussed above, the input signal 344 will either be $A \cos(\omega_c t)$ or $-A \cos(\omega_c t)$ during the first part of a pulse time $T_b$, depending on the value of the first transmitted bit, and will be 0, $A \cos(\omega_c t)$, or $-A \cos([<b]old107\ _c t)$ during the second part of the pulse time $T_b$, depending on the value of the second transmitted bit. The input signal 344 is provided to multiplier 322 along with an oscillating signal 346 generated by the signal generator 320. The oscillating signal 346 has a voltage that oscillates according to the function $\cos(\omega_c t)$. The multiplier 322 multiplies the input signal 344 by the oscillating signal 346 to generate a multiplied input signal 348.

The multiplied input signal 348 will be 0, $A \cos^2(\omega_c t)$, or $-A \cos^2(\omega_c t)$, depending on the value of the input signal 344. Mathematically, the signal $A \cos^2(\omega_c t)$ may also be quantified as $A/2 + A/2 \cos(2\omega_c t)$ and the signal $-A \cos^2(\omega_c t)$ may also be quantified as $-A/2 - A/2 \cos(2\omega_c t)$. The multiplied input signal 348 is then received by the low pass filter 324 which suppresses the high frequency component of the multiplied signal 348 to generate a filtered input signal 350 which will have a value of 0, $A/2$ or $-A/2$.

The filtered input signal 350 is then received by the accumulator 326. The accumulator 326 operates to accumulate the charge of the filtered input signal 350 during the first part of the pulse time $T_b$. After the accumulator 326 has accumulated the charge of the filtered input signal 350 during the first part of the pulse time $T_b$, it outputs an accumulated voltage 352 to the decision circuit 328. The decision circuit 328 makes a decision regarding the value of the first received bit based on the accumulated voltage 352 and outputs a first received bit 354.

After the first part of the pulse time $T_b$, the accumulator 326 is abruptly discharged by a pulse (for example, a very narrow pulse), and then resumes operation to accumulate the charge of the filtered input signal 348 during the second part of the pulse time $T_b$. After the accumulator 326 has accumulated the charge of the filtered input signal 348 during the second part of the pulse time $T_b$, it outputs an accumulated voltage 352 to the decision circuit 328. The decision circuit 328 makes a decision regarding the value of the second received bit based on the accumulated voltage 352 and outputs a second received bit 356.

Figure 5:
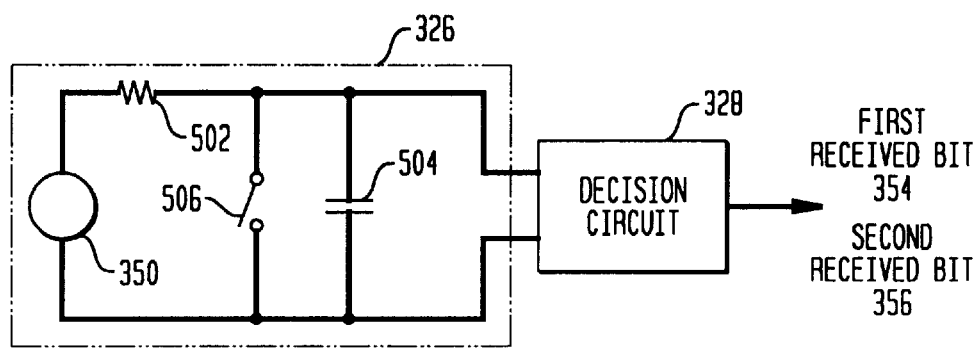
FIG. 5 depicts an exemplary accumulator circuit that may be used in the receiver portion of a BPSK-based modulation/demodulation system in accordance with an embodiment of the present invention.

The accumulator 326 may be implemented as a very simple voltage storage circuit. An example accumulator 326 is depicted in FIG. 5, and is shown connected to the decision circuit 328. The example accumulator 326 of FIG. 5 includes a resistor 502, a capacitor 504, and a control switch 506. The filtered input signal 350 is represented in FIG. 5 as a voltage source.

In operation, the accumulator 326 of FIG. 5 accumulates the charge from the filtered input signal 350 across the capacitor 504 during the first part of a pulse time $T_b$. The capacitor 504 is then abruptly discharged by the control switch 506, which may controlled by a timing circuit, such as a one-shot (not shown). Then, during the second part of the pulse time $T_b$, the accumulator 326 of FIG. 5 again accumulates the charge from the filtered input signal 350 across the capacitor 504 during the second part of the pulse time $T_b$. The decision circuit 328 makes a decision about the value of the first received bit 354 and the second received bit 356 based on the voltage accumulated on the capacitor 504 during the first and second parts of the pulse time $T_b$, respectively.

The use of an accumulator, such as the accumulator 326, by receiver embodiments of the present invention improves the reliability of received digital information. This is because an accumulator performs an analog accumulation of many samples of received data, as opposed to sampling methods that sample received signals at at a single point.

Figure 6A:
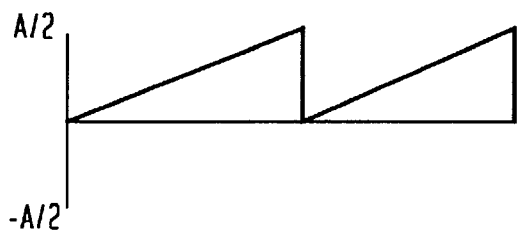
FIGS. 6A–6D illustrate voltage accumulator waveforms that may be generated in the receiver portion of a BPSK-based modulation/demodulation system in accordance with an embodiment of the present invention.

FIGS. 6A–6D depict the accumulated voltage value 352 generated by the accumulator 326 during a pulse time $T_b$ corresponding to the four different received bit combinations (0,0), (0,1), (1,0) and (1,1), respectively. For example, FIG. 6A depicts the voltage value 352 generated by the accumulator 326 during a pulse time $T_b$ where the first and second received bits are both a zero. In accordance with this embodiment, during the first part of the pulse time $T_b$, a voltage of $A/2$ is accumulated, corresponding to a first received bit value of zero. During the second part of the pulse time $T_b$, a voltage of $A/2$ is also accumulated, indicating that the second received bit is also a zero.

Figure 6B:
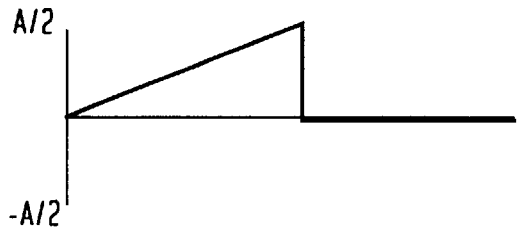

FIG. 6B depicts the accumulated voltage value 352 generated by the accumulator 326 during a pulse time $T_b$ where the first received bit is a zero, and the second received bit is a one. Here, as in FIG. 6A, a voltage of $A/2$ is accumulated during the first part of the pulse time $T_b$, corresponding to a first received bit value of zero. However, during the second part of the pulse time $T_b$, zero voltage is accumulated, indicating that the second received bit is a one.

Figure 6C:
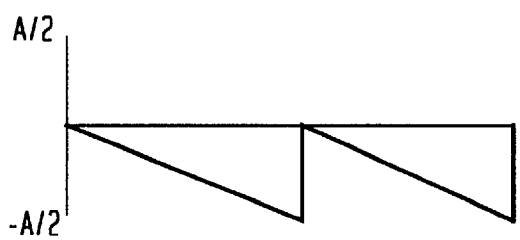

FIG. 6C depicts the voltage value 352 generated by the accumulator 326 during a pulse time $T_b$ where the first received bit is a one and the second received bit is a zero. In accordance with this embodiment, during the first part of the pulse time $T_b$, a voltage of $-A/2$ is accumulated, corresponding to a first received bit value of zero. During the second part of the pulse time $T_b$, a voltage of $-A/2$ is also accumulated, indicating that the second received bit is a zero.

Figure 6D:
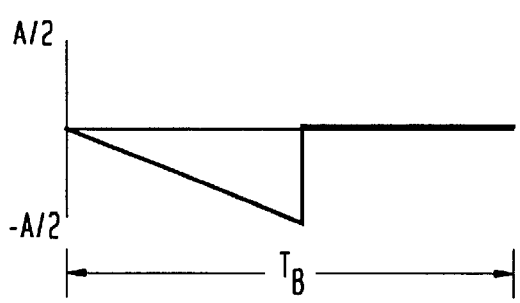

FIG. 6D depicts the voltage value 352 generated by the accumulator 326 during a pulse time $T_b$ where the first and second received bits are both equal to one. Here, as in FIG. 6C, a voltage of $-A/2$ is accumulated during the first part of the pulse time $T_b$, corresponding to a first received bit value of one. However, during the second part of the pulse time $T_b$, zero voltage is accumulated, indicating that the second received bit is also a one.

As described above, the decision circuit 328 is designed to make two decisions during a pulse time $T_b$ to recover two received bits.

The decision circuit 328 makes a first decision to determine the value of the first received bit 354 by comparing the value of the accumulated voltage 352 to a threshold voltage after the first part of pulse time $T_b$. As shown in FIGS. 6A–6D, the value of the accumulated voltage 352 after the first part of the pulse time $T_b$ will either be A/2 volts, signifying a first received bit equal to zero, or –A/2 volts, signifying a first received bit 354 equal to one. Accordingly, a suitable threshold voltage for the first decision is 0 volts, as it represents a middle value between A/2 and –A/2 volts. Where a threshold voltage of zero volts is used, the decision circuit will output a first received bit 354 of zero if the accumulated voltage 352 after the first part of the pulse time $T_b$ is greater than zero volts, and will output a first received bit 354 of one if the accumulated voltage 352 after the first part of the pulse time $T_b$ is less than zero volts. However, other threshold voltages may be used to implement the first decision, provided that the threshold voltage falls somewhere between the minimum and maximum values of the accumulated voltage 352 after the first part of the pulse time $T_b$.

The decision circuit 328 also makes a second decision to determine the value of the second received bit 356 by comparing the value of the accumulated voltage 352 to a first and second voltage range. As shown in FIGS. 6A–6D, the value of the accumulated voltage 352 after the second part of the pulse time $T_b$ will be 0, A/2, or –A/2 volts, where a value of 0 volts corresponds to a second received bit 356 of one, and a value of A/2 or –A/2 volts corresponds to a second received bit 356 of zero. Accordingly, a suitable first voltage range for the second decision is any voltage greater than A/4 volts or less than –A/4 volts, and a suitable second voltage range for the second decision is any voltage less than A/4 volts and greater than –A/4 volts, as ±A/4 volts represents a middle value between 0 and ±A/2 volts. Where these voltage ranges are used, the decision circuit 328 will output a second received bit 356 of zero if the accumulated voltage 352 after the second part of the pulse time $T_b$ is greater than A/4 or less than –A/4 volts, and will output a second received bit 356 of one if the accumulated voltage 352 after the second part of the pulse time $T_b$ is less than A/4 and greater than –A/4 volts. However, other voltage ranges may be used to implement the decision circuit 328.

The BPSK-based modulation/demodulation system 300 described above permits the transmission of two bits per pulse time $T_b$, which is twice the transfer rate achieved by the conventional BPSK modulation/demodulation system 100 described in reference to FIG. 1. However, the BPSK-based modulation/demodulation system 300 does not suffer from a decrease in transmission reliability with respect to conventional BPSK systems. In fact, it is expected that the BPSK-based modulation/demodulation system 300 will perform with greater reliability than conventional BPSK systems that operate at half the transfer rate. Furthermore, the BPSK-based modulation/demodulation system 300 will not require additional transmission power to achieve this level of reliability.

The improvement in transmission reliability may be demonstrated mathematically by comparing the performance of a system in accordance with the present invention with the performance of conventional BPSK and QPSK systems for values of Eb/N of 10, 15, and 20 dB, where Eb is the energy per bit, and N is noise.

The probability of symbol error for a modulation/demodulation system in accordance with the present invention can be calculated as follows, assuming binomial distribution:

$Pr$(symbol error)=$Pr$(decision error in the first part)+$Pr$(decision error in the second part)

Assuming an equal probability of error for all samples, then the probability of error in decision per part is calculated as:
$Pr$(decision error/part)=

$$Pr(\text{decision error}/\text{part}) = \sum_{i=1+\frac{n}{2}}^{n} \frac{n!}{(n-i)!i!} Pr(\text{sample} - \text{error})^i (1 - pr(\text{sample} - \text{error}))^n$$

$$Pr(\text{sample-error in the first part}) = pr(n > A) = Q\left(\sqrt{\frac{2Eb}{N}}\right)$$

$$Pr(\text{sample-error in the second part}) = pr(n > A/2) = Q\left(\sqrt{\frac{Eb}{2N}}\right)$$

Thus, for Eb/N=10 dB, pr(sample-error in the first part)= Q(4.472)=0.39×10$^5$, and pr(sample-error in the second part)=Q(2.236)=0.13×10$^{-1}$.

For Eb/N=15 dB, pr(sample-error in the first part)=Q (7.95)=0.93×10$^{-15}$, and pr(sample-error in the second part)= Q(3.98)=0.34×10$^{-4}$.

For Eb/N=20 dB, pr(sample-error in the first part)=Q (14.14)<10$^{-23}$, and pr(sample-error in the second part)=Q (7.07)=0.77×10$^{-14}$.

If we assume that the number of samples n=100 during each part, then the pr(symbol error) for a system in accordance with the present invention is given as:

For Eb/N=10 dB, pr(symbol error)=

For $Eb/N = 10$ dB, $$pr(\text{symbol error}) = \sum_{i=51}^{100} \frac{100!}{(100-i)!i!}(.39 \times 10^{-5})^i(.9999961)^{(100-i)} +$$

$$\sum_{i=51}^{100} \frac{100!}{(100-i)!i!}(.13 \times 10^{-1})^i(.987)^{(100-i)} = 3.4 \times 10^{-68}$$

For Eb/N=15 dB, and 20 dB, pr(symbol error) is extremely small, approximately zero.

In contrast, Table 1 lists the probability of symbol error for conventional BPSK and QPSK modulation techniques at Eb/N=10 dB, 15 dB, and 20 dB.

TABLE 1

| Eb/N dB | Pr(symbol error) for BPSK | Pr(symbol error) for QPSK |
| --- | --- | --- |
| 10 | 3.88208 × 10$^{-06}$ | 7.9142 × 10$^{-06}$ |
| 15 | 2.1756 × 10$^{-08}$ | 4.52654 × 10$^{-08}$ |
| 20 | 1.2882 × 10$^{-10}$ | 2.75019 × 10$^{-10}$ |

As can be seen from Table 1, and the results set forth above, the system in accordance with the present invention provides a better performance than conventional BPSK and QPSK systems.

It should be further noted that transmitter embodiments in accordance with the present invention generate a power savings as compared to conventional transmitters because digital information may be conveyed in the absence of a transmitted signal. For example, in further regard to the transmitter portion 302 discussed in reference to FIG. 3 above, for the bit combinations of (0,1) and (1,1), no signal is transmitted during the second part of the pulse time $T_B$. This is also demonstrated by the output signals shown in FIGS. 4B and 4D.

Figure 7:
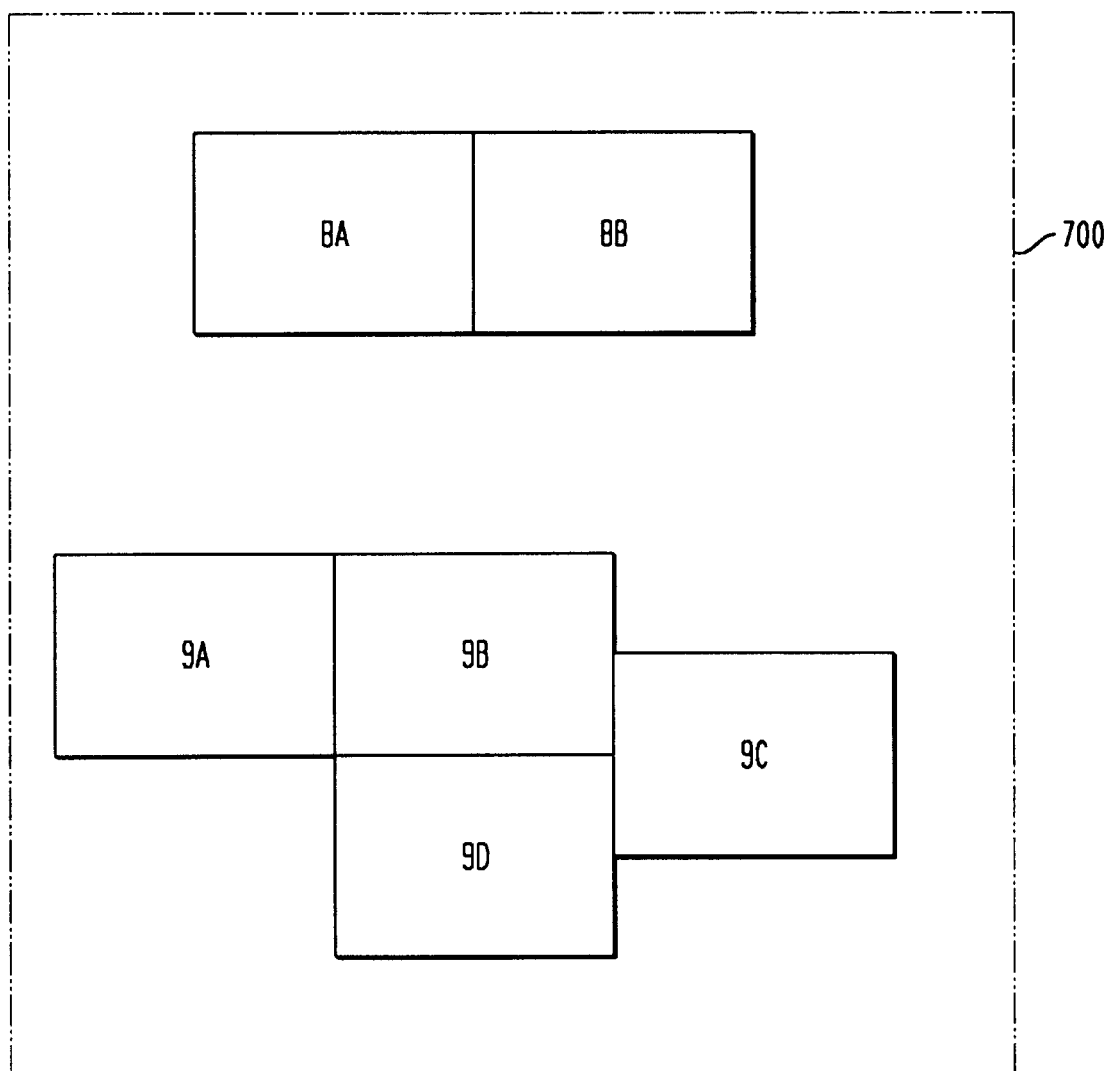
FIG. 7 is a key for viewing the detailed functional diagrams of FIGS. 8A–8B and FIGS. 9A–9D to facilitate understanding of the interconnections between the drawings.
Figure 8A:
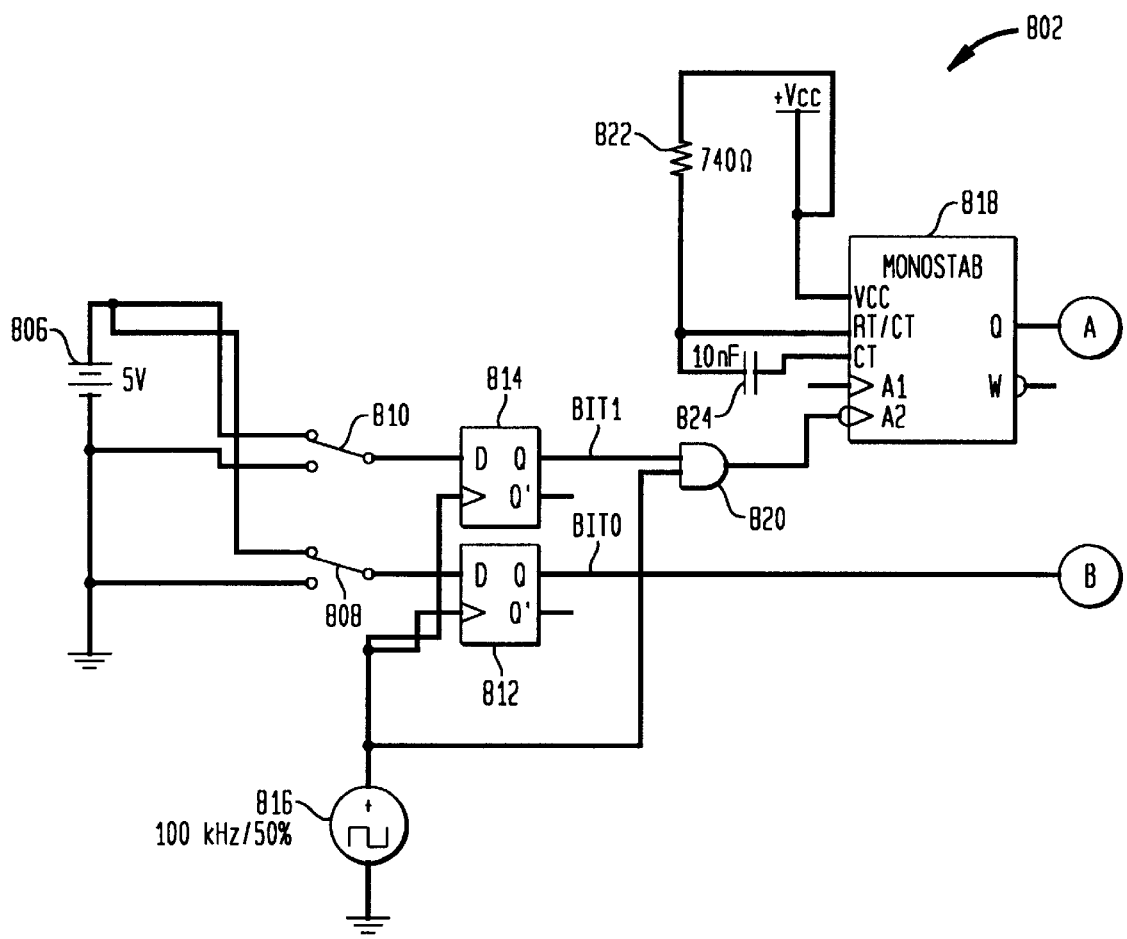
FIGS. 8A–8B are detailed functional diagrams of a BPSK-based modulation/demodulation system in accordance with the an embodiment of the present invention.
Figure 8B:
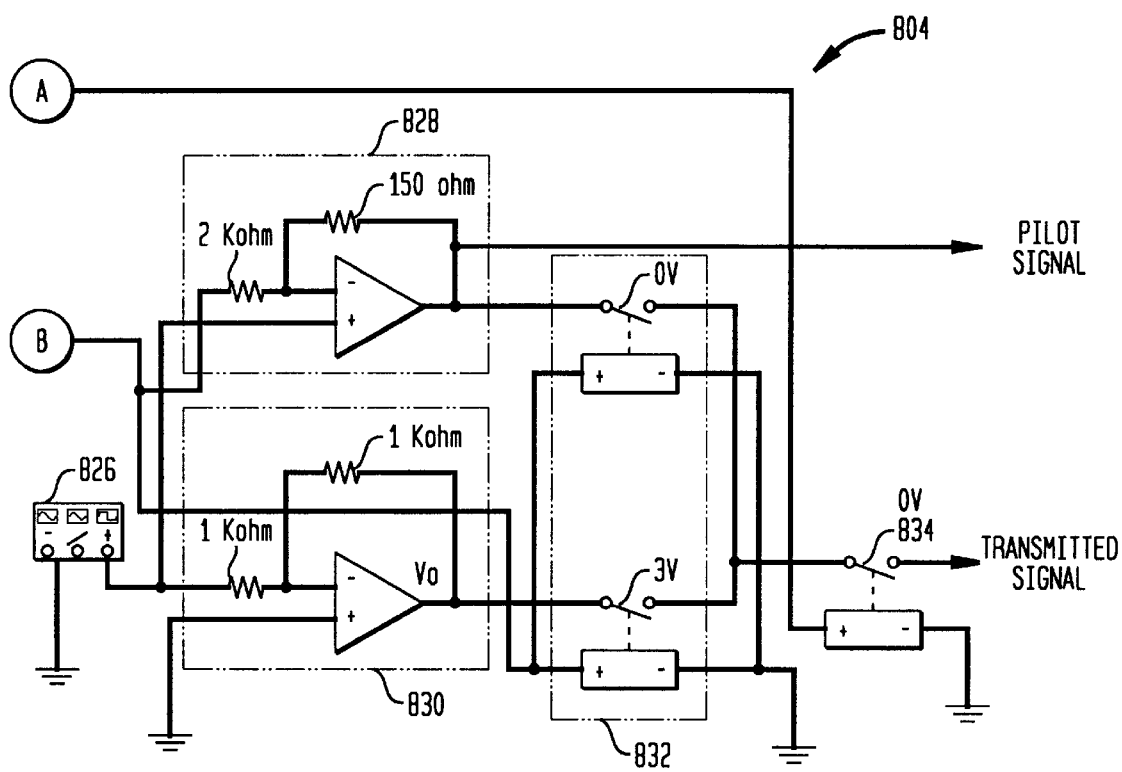

FIGS. 8 and 9 present a more detailed functional diagram of a BPSK-based modulation/demodulation system in accordance with an embodiment of the present invention. FIG. 7 depicts a key 700 for viewing the detailed functional diagrams of FIGS. 8A–8B and FIGS. 9A–9D to facilitate understanding of the interconnections between the drawings. Because FIGS. 8A–8B and 9A–9D are functional diagrams, each of the various individual functional components described therein may be implemented according to a variety of known circuit elements and structures as would be apparent to one of ordinary skill in the art.

FIG. 8 is a more detailed functional diagram of the transmitter portion of a BPSK-based modulation/demodulation system in accordance with an embodiment of the present invention. The transmitter portion is divided into two transmitter blocks: transmitter block 802, which is depicted in FIG. 8A, and transmitter block 804, which is depicted in FIG. 8B. FIG. 7 shows how the functional diagrams in FIG. 8A and 8B may be arranged to better understand the interconnections between the drawings.

The transmitter block 802 of FIG. 8A includes a battery 806, a first switch 808, a second switch 810, a first flip-flop 812, a second flip-flop 814, a clock 816, a monostable (or one shot) 818 and an AND gate 820. The transmitter block 802 operates to store two bits to be transmitted, Bit 0 and Bit 1, in the first flip-flop 812 and the second flip-flop 814, respectively, in order to prepare the bits for transmission.

The first switch 808 and the second switch 810 serve to couple the first flip-flop 812 and the second flip-flop 814, respectively, to either the battery 806 or to ground. The first switch 808 and the second switch 810 may each be coupled to a voltage of 5 volts, representing a bit value of one, or 0 volts, representing a bit value of zero. In FIG. 8A, the first switch 808 and the second switch 810 are each shown coupled to the 5 volt source, indicating that both bits to be transmitted are one.

Under the control of the clock 816, the first flip-flop 812 and the second flip-flop 814 latch the bits to be transmitted from the first switch 808 and the second switch 810, respectively. In the embodiment depicted in FIG. 8A, the first flip-flop 812 and the second flip-flop 814 are positive-edge-triggered flip-flops, meaning that when the signal generated by the clock 816 goes high, then the bits to be transmitted will be transferred from the input to the output of each flip-flop. The first flip-flop 812 outputs Bit 0 and the second flip-flop 814 outputs Bit 1.

When the signal generated by the clock 816 goes high, the first flip-flop is triggered to output Bit 0. Additionally, when the signal generated by the clock 816 goes high, the second flip-flop is triggered to output Bit 1 to a first input of the AND gate 820 and a high signal (logical 1) is input to the second input of the AND gate 820. When both inputs to the AND gate 820 are high, the output of the AND gate 820 will also be high.

The output of the AND gate 820 is connected to the active-low input of the monostable 818. Accordingly, whenever the output of the AND gate 820 drops from high to low, the monostable will generate a high signal. The output of the AND gate 820 will drop from high to low whenever the signal generated by the clock 816 drops from high to low and Bit 1 is equal to one.

Figure 10A:
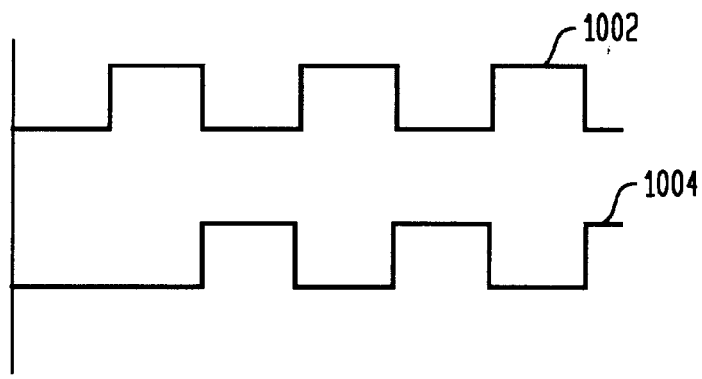
FIGS. 10–10E illustrate various signal waveforms generated in a BPSK-based modulation/demodulation system in accordance with an embodiment of the present invention.

FIG. 10A depicts the relationship between the signal generated by the clock 816, shown as signal 1002, and the signal generated by the monostable 818, shown as signal 1004, when Bit 1 is a one. As shown in FIG. 10A, the clock signal 1002 alternates between low and high (logical zero and logical one). Because Bit 1 is a one, the output of the AND gate 820 will be high whenever the clock signal 1002 is high. When the clock signal 1002 is low, the output of the AND gate 820 will go from high to low, causing the monostable 818 to generate an output signal 1004 which is high for a certain amount of time. With further reference to FIG. 8A, the amount of time that the output from the monostable 818 is high is determined by the properties of the resistor 822 and the capacitor 824 which are connected to the monostable 818. In embodiments, the properties of the resistor 822 and the capacitor 824 are selected so that the amount of time that the output of the monostable 818 is high is approximately one-half of the period of the clock 816.

The transmitter block 804 of FIG. 8B includes an oscillator 826, a first operational amplifier 828, a second operational amplifier 830, a multiplexer 832, and a switch 834.

The oscillator 826 generates a high-frequency carrier signal which is used to transmit the data. The first operational amplifier 828 receives the high-frequency carrier signal and outputs a positive phase signal to the multiplexer 832, which is also transmitted as a pilot signal. The second operational amplifier 830 receives the high-frequency carrier signal and outputs a negative phase signal to the multiplexer 832. Whether the signal output by the operational amplifiers is a positive phase or negative phases is determined by the way the operational amplifiers are configured.

The multiplexer 832 is comprised of two switches that are controlled by Bit 0, which is received from flip-flop 812 of FIG. 8A. If Bit 0 is a zero, then the multiplexer 832 will output the positive phase signal. If Bit 0 is one then multiplexer 832 will output the negative phase signal.

The switch 834 is controlled by the output of the monostable 818 of FIG. 8A. According to this configuration, during the first part of the period of the clock 816 of FIG. 8A (when the clock is low), the output of the monostable 818 will be high, causing the switch 834 to remain in a closed position. During the second part of the period of the clock 816 of FIG. 8A (when the clock is high), the output of the monostable 818 will be high when Bit 1 is a zero, causing the switch 834 to remain in a closed position, and low when Bit 1 is a one, causing the switch 834 to switch to an open position.

FIG. 9 is a more detailed functional diagram of the receiver portion of a BPSK-based modulation/demodulation system in accordance with an embodiment of the present invention. The receiver portion is divided into four receiver blocks: receiver block 902, which is depicted in FIG. 9A, receiver block 904, which is depicted in FIG. 9B, receiver block 906, which is depicted in FIG. 9C, and receiver block 908, which is depicted in FIG. 9D. FIG. 7 shows how the functional diagrams in FIG. 9A through 9D may be arranged to better understand the interconnections between the drawings.

Figure 9A:
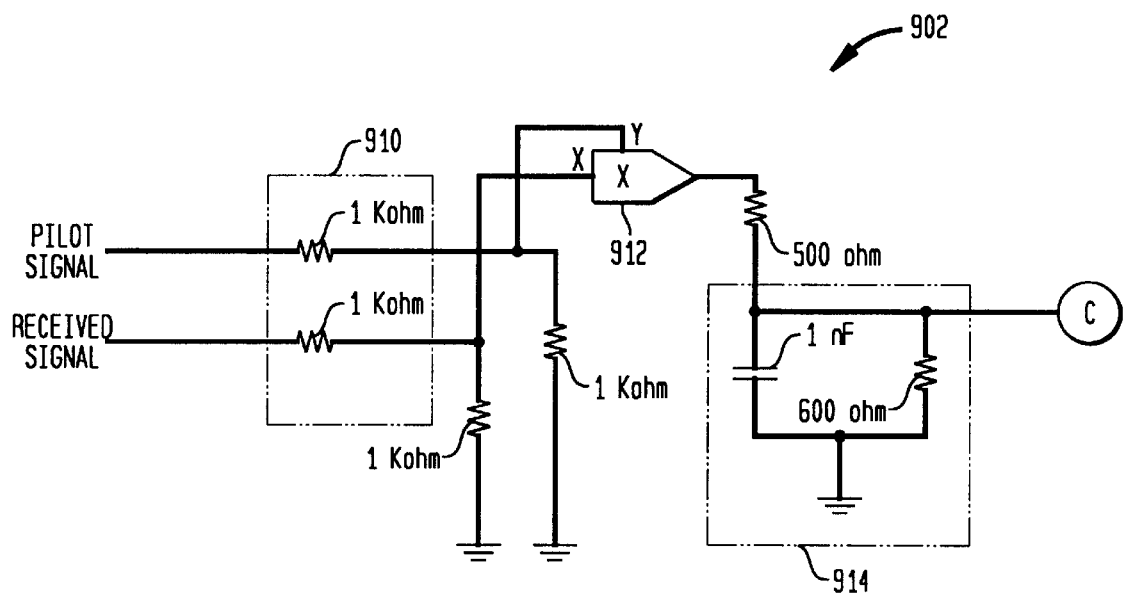
FIGS. 9A–9D are a detailed functional diagram of a BPSK-based modulation/demodulation system in accordance with an embodiment of the present invention.

The receiver block 902 of FIG. 9A includes a multiplier 912 and a low pass filter 914. A pilot signal and a received signal are received by the receiver block 902 over a transmission medium 910, which is represented in FIG. 9A as two 1 kOhm resistors. The pilot signal is used to demodulate the received signal and the received signal carries the transmitted bit information.

The received signal is either $A \cos(\omega_c t)$, $-A \cos(\omega_c t)$ or zero. The pilot signal is always $\cos(\omega_c t)$. The pilot signal and the received signal are input to the multiplier 912, which multiplies the two signals together. Accordingly, the output of the multiplier 912 will either be $A/2 + A/2 \cos(2\omega_c t)$, $-A/2 - A/2 \cos(2\omega_c t)$, or zero. The multiplied signal is then input to the low pas filter 914, which blocks the high frequency component of the multiplied signal and outputs the DC component of the multiplied signal.

Figure 10B:
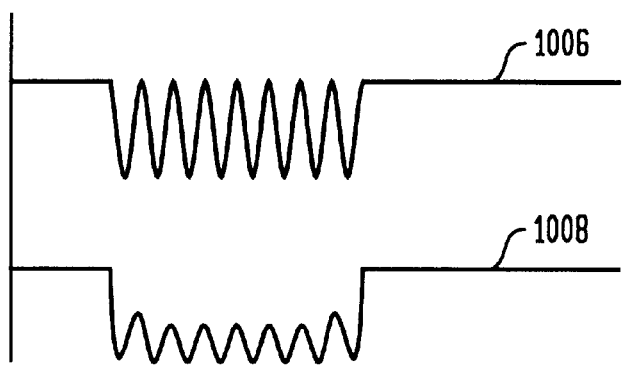

FIG. 10B depicts the relationship between the received signal, shown as signal 1006, and the output of the low pass filter 914, shown as signal 1008, when the transmitted bits are both equal to one. The received signal 1006 is shown as a sinusoidal wave during the first part of a pulse time, indicating a transmitted Bit 0 equal to one, followed by no signal during the second part of a pulse time, representing a transmitted Bit 1 equal to one, as explained above. The signal 1008 output from the low pass filter 914 is not an ideal DC signal, but instead shows ripples. This is due in part to the fact that the low pass filter 914 is a very simple circuit consisting of only a resistor and a capacitor.

Figure 9B:
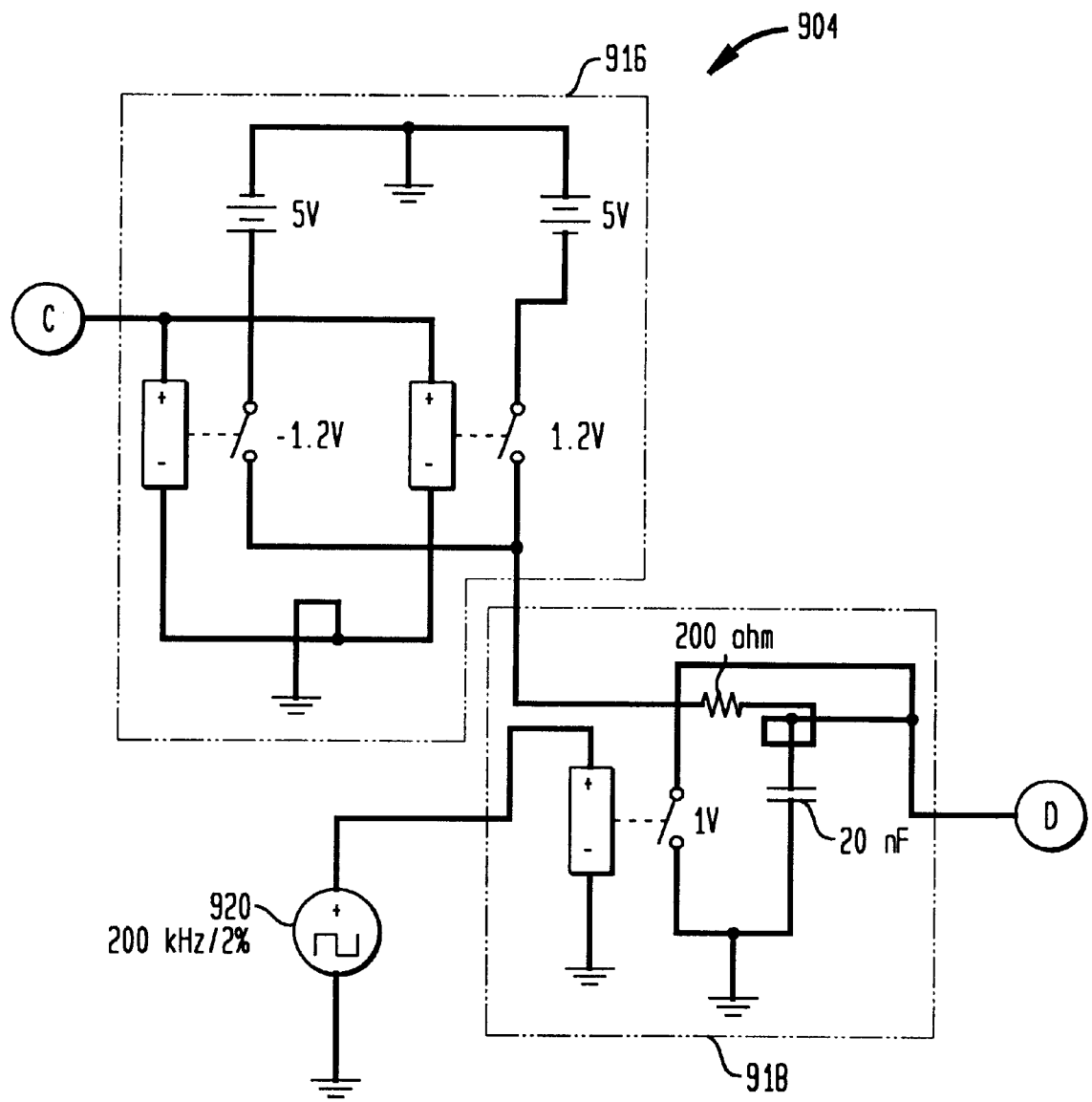

The receiver block 904 of FIG. 9B includes a smoothing circuit 916, an accumulator circuit 918, and a pulse generator 920.

The smoothing circuit 916 includes two batteries and two switches. The switches are controlled by the output signal from the low pass filter 914 of FIG. 9A. If the signal from the low pass filter 914 is a positive signal, then the smoothing circuit 916 as configured will output a precise 5 volt signal. If the signal from the low pass filter 914 is a negative signal, then the smoothing circuit 916 will output a precise −5 volts. If the signal from the low pass filter is zero volts, then the smoothing circuit 916 will output zero volts.

The output of the smoothing circuit 916 is input to the accumulator circuit 918, which in this embodiment consists of a resistor and capacitor. The capacitor within the accumulator circuit 918 accumulates the charge generated by the smoothing circuit 916. The accumulator circuit 918 is also coupled to a pulse generator 920, which periodically discharges the accumulator circuit 918 by periodically closing a switch to ground within the accumulator circuit 918.

Figure 10C:
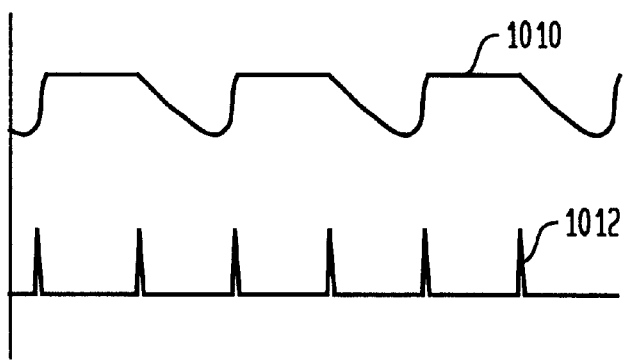

FIG. 10C depicts the relationship between the signal output by the accumulator circuit 918, shown as signal 1010, and the signal output by the pulse generator 920, shown as signal 1012, when the transmitted bits are both equal to one. Signal 1010 shows a pattern of negative accumulation on the capacitor of the accumulator circuit 918 indicating a transmitted Bit 0 equal to one, followed by a period of no accumulation indicating a transmitted Bit 1 also equal to one. Signals 1010 and 1012 demonstrate that whenever a pulse is generated by the pulse generator 920, the negative accumulation across the capacitor of the accumulation circuit 918 is discharged.

Figure 9C:
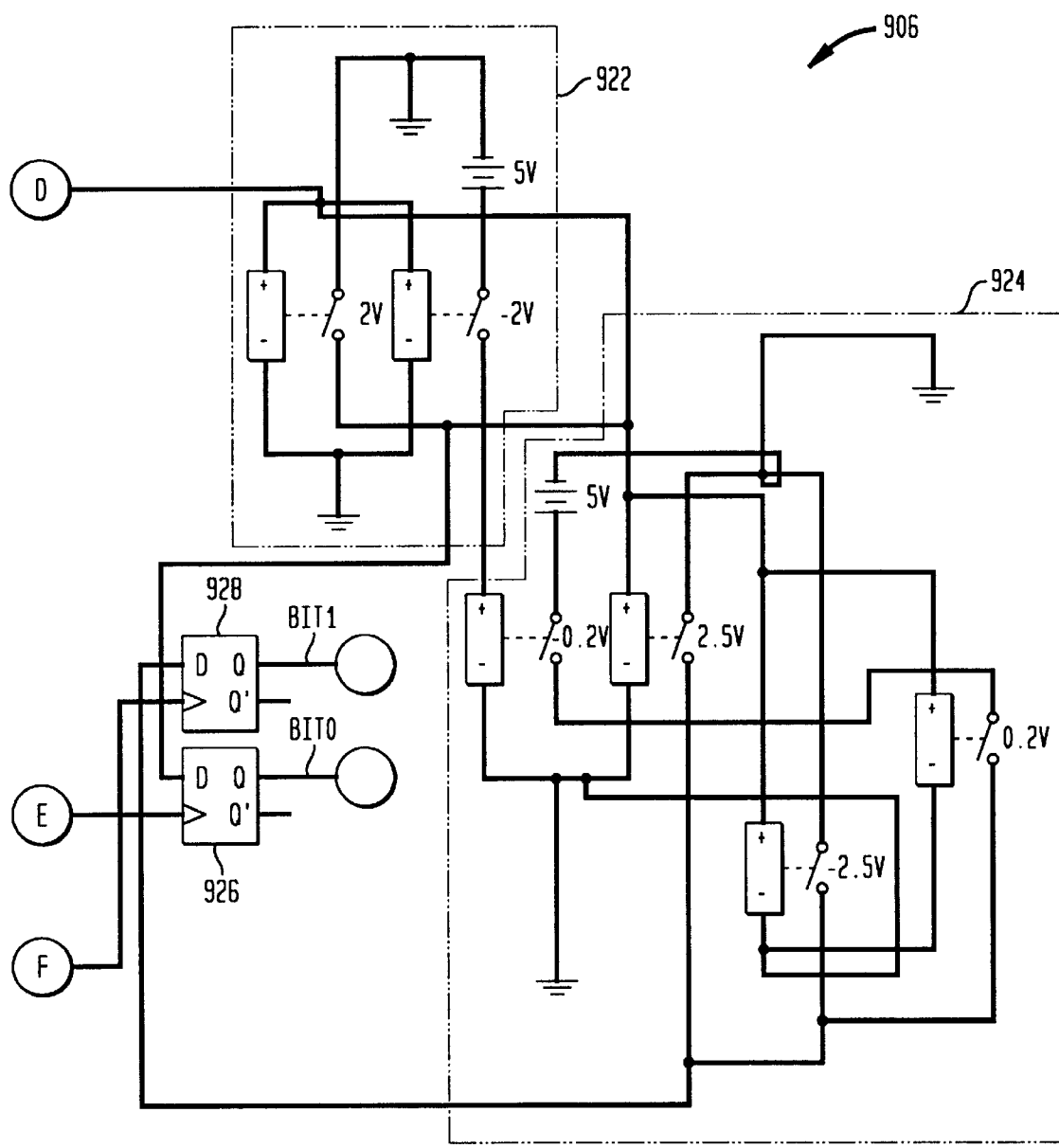

The receiver block 906 of FIG. 9C includes a Bit 0 decision circuit 922, a Bit 1 decision circuit 924, a first flip-flop 926, and a second flip-flop 928.

The Bit 0 decision circuit 922 receives the output of the accumulator circuit 918 of FIG. 9B and tests it. If the output of the accumulator circuit 918 is higher than a predefined threshold voltage, then received Bit 0 is assigned a value of zero, and if it is lower than a predefined threshold voltage, then received Bit 0 is assigned a value of one.

The Bit 0 decision circuit 922 includes two switches, each with its own threshold voltage. In the embodiment depicted in FIG. 9C, the threshold voltage of a first switch within the Bit 0 decision circuit 922 is 2 volts and the threshold voltage of a second switch within the Bit 0 decision circuit 922 is −2 volts. If the output of the accumulator circuit is greater than 2 volts, then the first switch within the Bit 0 decision circuit 922 will close and the Bit 0 decision circuit will output zero volts. If the output of the accumulator circuit is less than −2 volts, then the second switch within the Bit 0 decision circuit 922 will close and the Bit 0 decision circuit will output a value of five volts. The output of the Bit 0 decision 922 circuit is input to the first flip-flop 926 which stores the output as Bit 0.

The Bit 1 decision circuit 924 also receives the output of the accumulator circuit 918 of FIG. 9B and tests it. The Bit 1 decision circuit 924 includes four switches. This is because there are three voltage regions that need to be tested for: a first region which is between two values close to zero, a second region being greater than a positive voltage, and a third region being less than a negative voltage. An accumulated voltage that falls within the first region indicates a received Bit 1 of one. An accumulated voltage that falls in either the second region or the third region indicates a received Bit 1 of zero.

In the embodiment depicted in FIG. 9C, the first region is tested for utilizing a first switch with a value of 0.2 volts in series with a second switch with a value of −0.2 volts, such that if the output of the accumulator circuit 918 is between −0.2 volts and 0.2 volts, the Bit 1 decision circuit will output 5 volts. The second and third regions are tested for using a first switch with a value of 2.5 volts in parallel with a second switch with a value of −2.5 volts, such that if the output of the accumulator circuit 918 is greater than 2.5 volts or less than −2.5 volts, the Bit 1 decision circuit will output zero volts. The output of the Bit 1 decision circuit 924 is input to the second flip-flop 928 which stores the output as Bit 1.

Figure 9D:
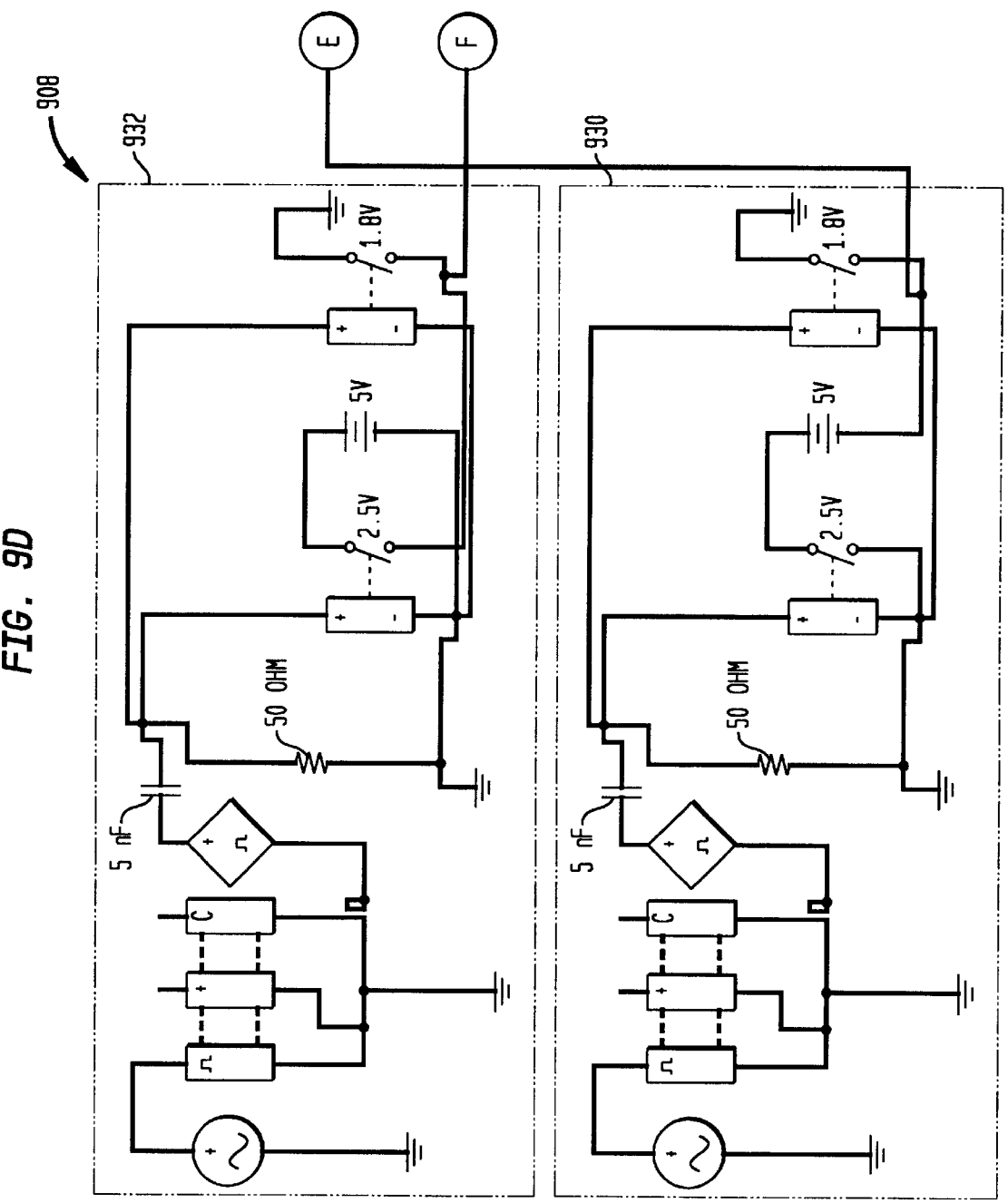

The receiver block 908 of FIG. 9D includes a first clock pulse generator 930 and a second clock pulse generator 932, which are used to clock the output of the Bit 0 decision circuit 922 and the output of the Bit 1 decision circuit 924 into the first flip-flop 926 and the second flip-flop 928, respectively. First clock pulse generator 930 and second clock pulse generator 932 each include two different sources with two different phase shifts, each with a controllable one-shot to generate clock pulses. The clock signals from each clock pulse generator may be synchronized with the main clock to assure that the clock pulses are generated at the appropriate times to latch the appropriate information into each flip-flop.

Figure 10D:
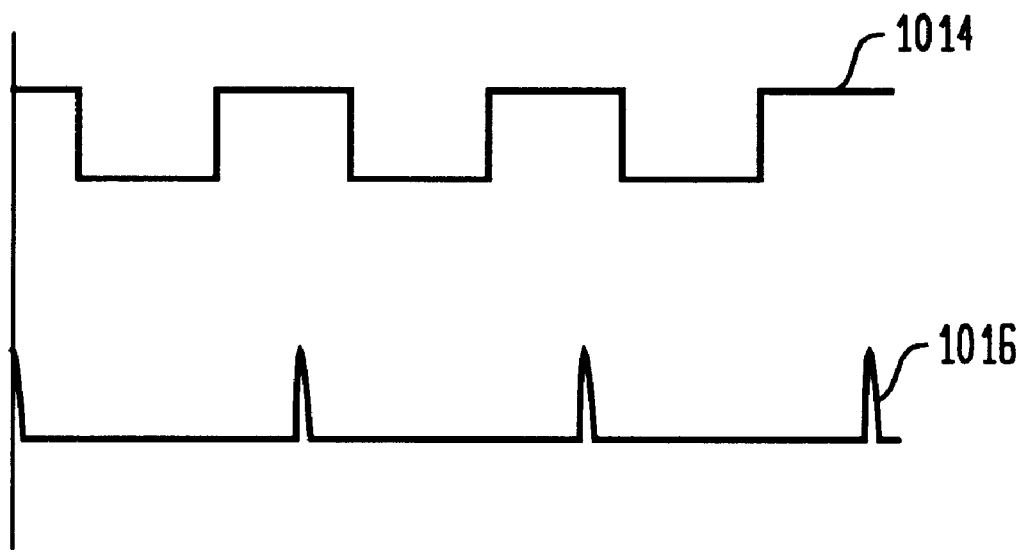

FIG. 10D depicts a signal 1014 which represents the output of the Bit 0 decision circuit 922 of FIG. 9C and a signal 1016 which represents the output of the first clock pulse generator 932 of FIG. 9D. In this example, the received Bit 0 is equal to one. As shown in FIG. 10D, when a clock pulse occurs in signal 1016, the appropriate bit information is latched from the signal 1014 into the first flip-flop 926.

Figure 10E:
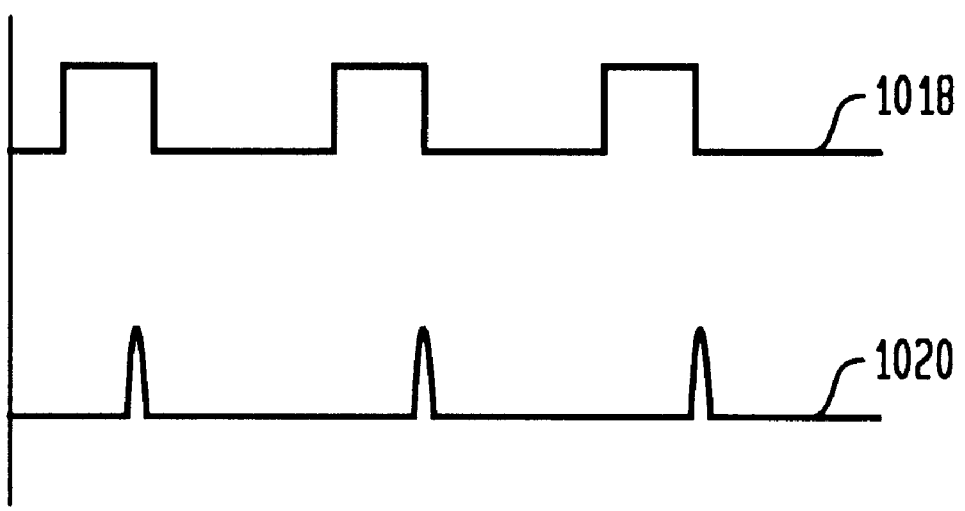

FIG. 10E depicts a signal 1018 which represents the output of the Bit 1 decision circuit 924 of FIG. 9C and a signal 1020 which represents the output of the second clock pulse generator 934 of FIG. 9D. In this example, the received Bit 1 is also equal to one. As shown in FIG. 10E, when a clock pulse occurs in signal 1018, the appropriate bit information is latched from the signal 1020 into the second flip-flop 928.

C. 16-QAM-based Modulation/Demodulation System in Accordance with an Embodiment of the Present Invention The present invention may be used in conjunction with other modulation techniques, such as conventional QAM digital modulation/demodulation techniques. For example, a 16-QAM-based modulation/demodulation system in accordance with the present invention permits an increased bit rate per pulse time $T_b$ as compared to conventional 16-QAM modulation/demodulation systems, but will not result in an associated increase in bit errors and also will not require an increase in the power of the transmitted signal.

FIG. 11 is a functional block diagram of the transmitter portion 1100 of a 16-QAM-based modulation/demodulation system in accordance with the present invention. The transmitter portion 1100 modulates five bits to be transmitted onto an oscillating signal and transmits the modulated signal.

The transmitter portion 1100 includes a conventional 16-QAM modulator 1102, an AND gate 1104, a switch 1106, and a transmitter antenna 1108. The conventional 16-QAM modulator 1102 receives bits 1–4 of the five bits to be transmitted, modulates the four bits onto a carrier signal in accordance with conventional 16-QAM modulation techniques, and outputs a modulated output signal 1118.

The fifth bit to be transmitted 1112 is input to the AND gate 1104. The other input to the AND gate 1104 is a signal 1114 that is clocked low during a first part of a pulse time $T_b$ and clocked high during a second part of the pulse time $T_b$. As a result, during the first part of the pulse time $T_b$, the output of the AND gate 1104 will always be low, while during the second part of the pulse time $T_b$ the output of the AND gate 1104 will either be high, if the fifth bit to be transmitted 1112 is a one, or low, if the fifth bit to be transmitted 1112 is a zero.

The output of the AND gate 1104 is a control signal 1116 that controls the switch 1106. When closed, the switch 1106 couples the modulated output signal 1118 from the conventional 16-QAM modulator 1102 to the transmitter antenna 1108. The control signal 1116 causes the switch 1106 to open when the control signal 1116 is high and to close when the control signal 1116 is low. When the switch 1106 is open, no signal is transmitted over the transmitter antenna 1108.

When the switch 1106 is closed, the modulated output signal 1118 from the conventional 16-QAM modulator 1102 will be transmitted via the transmitter antenna 1108.

The above-described configuration of the transmitter portion 1102 has the effect of dividing the transmission pulse time $T_b$ into two parts. During the first part of the pulse time $T_b$, bits 1–4 of the five bits to be transmitted are transmitted in accordance with a conventional 16-QAM modulation technique. The shape of the signal transmitted during the second part of the pulse time $T_b$ is then determined based on the value of the fifth bit to be transmitted 1112. For example, if the fifth bit to be transmitted 1112 is a zero, then the shape of the transmitted signal during the second part of the pulse time $T_b$ will be the same as the signal transmitted during the first part of the pulse time $T_b$. That is to say, if the value of the fifth bit to be transmitted 1112 is zero, then the shape of the transmitted signal is held constant throughout the first and second parts of the pulse time $T_b$. However, if the value of the second bit to be transmitted 1112 is a one, then the switch 1106 will be open during the second part of the pulse time $T_b$ and the transmitted signal during the second part of the pulse time $T_b$ will be forced to zero.

FIG. 12 is a functional block diagram of the receiver portion 1200 of a 16-QAM-based modulation/demodulation system in accordance with the present invention. The receiver portion 1200 receives the transmitted signal from the transmitter portion 1100, described above in regard to FIG. 11, and demodulates the signal to recover five bits per pulse time $T_b$.

The receiver portion 1200 includes a receiver antenna 1202, an accumulator 1206, a decision circuit 1208, and a module 1204 that further includes a first multiplier 1210, a second multiplier 1212, a first integrator 1214, a second integrator 1216, an adder unit 1218, and a comparator 1220.

The receiver antenna 1202 receives a transmitted signal carrying 5 bits per pulse time $T_b$. The module 1204 within the receiver portion 1200 operates during a first part of the pulse time $T_b$ to recover received bits 1–4 according to a conventional 16-QAM demodulation technique. In particular, the first multiplier 1210 and the second multiplier 1212 multiply the received signal by $\cos(\omega_c t)$ and $\sin(\omega_c t)$, respectively, and output multiplied signals. The first integrator 1214 and the second integrator 1216 perform a matched filtering operation on the multiplied signals and output the filtered signals to the adder unit 1218. The adder unit 1218 adds the input signals to generate one of 16 possible $\Sigma$ (sigma) values from $-E1/2$ through $-E16/2$. The comparator 1220 receives the $\Sigma$ value from the adder unit 1218 and, based on the $\Sigma$ value, assigns a value to each of the received bits 1–4.

The configuration of the module 1204 is provided as an example only. Other configurations for demodulating a signal in accordance with conventional 16-QAM demodulation techniques are readily available to persons skilled in the art.

During the second part of the pulse time $T_b$, the accumulator 1206 accumulates the charge from the signal received via receiver antenna 1202 and provides the accumulated voltage to the decision circuit 1208 which assigns a value to the received bit 5 based on the value of the accumulated voltage. In accordance with the 16-QAM-based embodiment of the present invention, an accumulated voltage of zero, or very close to zero, will indicate a fifth received bit of one, while an accumulated voltage above a first predetermined threshold voltage or below a second predetermined threshold voltage will indicate a fifth received bit of zero.

D. Alternate Modulation/Demodulation Systems in Accordance with an Embodiment of the Present Invention As demonstrated by the examples described above, the present invention may be used in conjunction with any digital modulation/demodulation technique, including but not limited to any conventional digital modulation/demodulation technique such as a BPSK, M-ary PSK, QAM, 16-QAM or 64-QAM digital modulation/demodulation technique. A modulation/demodulation system in accordance with the present invention permits an increased bit rate per pulse time $T_b$ as compared to conventional modulation/demodulation systems, but will not result in an associated increase in bit errors and also will not require an increase in the power of the transmitted signal.

Figure 13:
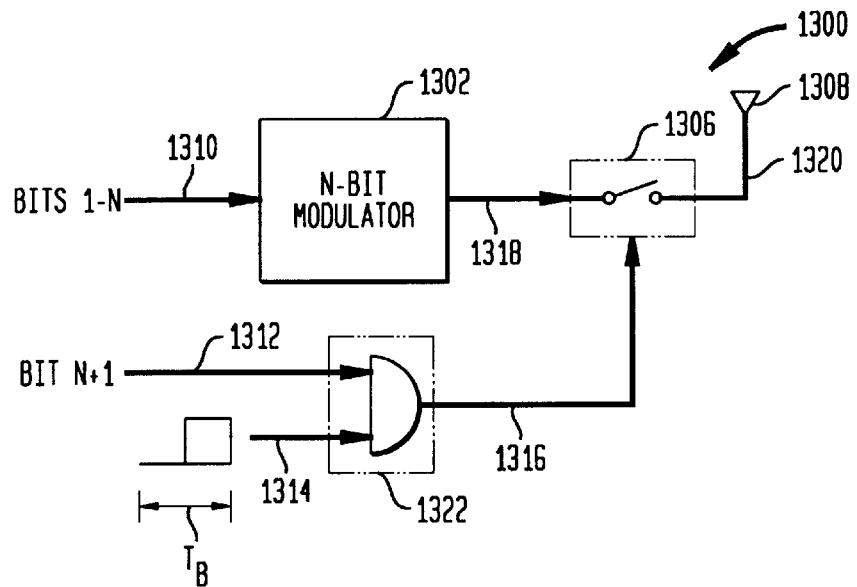
FIG. 13 is a functional diagram of the transmitter portion of a modulation/demodulation system in accordance with an embodiment of the present invention.

FIG. 13 is a functional block diagram of the transmitter portion 1300 of a modulation/demodulation system in accordance with the present invention. The transmitter portion 1300 modulates N+1 bits to be transmitted onto an oscillating signal and transmits the modulated signal.

The transmitter portion 1300 includes an N-bit modulator 1302, control logic 1322, a switch 1306, and a transmitter antenna 1308. The N-bit modulator 1302, which may comprise any conventional digital modulator, receives bits 1–N of the N+1 bits to be transmitted, modulates the N bits onto a carrier signal, and outputs a modulated output signal 1318. In embodiments, the N-bit modulator 1302 modulates the N bits onto a carrier signal in accordance with a conventional digital modulation technique such as, but not limited to, a BPSK, M-ary PSK, QAM, 16-QAM or 64-QAM digital modulation technique.

The N+1 bit to be transmitted 1312 is input to control logic 1322. The other input to the control logic 1322 is a timing signal 1314. The control logic 1322 receives the N+1 bit to be transmitted 1312 and the timing signal 1314 and generates a control signall 316 that controls the switch 1306. During the first part of a pulse time $T_b$, the control signal 1316 controls the switch 1306 to be closed. During the second part of the pulse time $T_b$, the control signal 1316 causes the switch 1306 to be closed if the N+1 bit to be transmitted 1312 is a zero and causes the switch 1306 to be open if the N+1 bit to be transmitted 1312 is a one.

In embodiments, the control logic 1322 may comprise an AND gate 1304, as shown in FIG. 13. However, various other elements for generating the control signal 1316 may be used, as would be appreciated by one of ordinary skill in the relevant art. In embodiments, the timing signal 1314 received by the AND gate 1304 is clocked low during a first part of a pulse time $T_b$ and clocked high during a second part of the pulse time $T_b$. As a result, during the first part of the pulse time $T_b$, the output of the AND gate 1304 will always be low, while during the second part of the pulse time $T_b$, the output of the AND gate 1304 will either be high, if the N+1 bit to be transmitted 1312 is a one, or low, if the N+1 bit to be transmitted 1312 is a zero.

As discussed above, the output of the control logic 1302 is a control signal 1316 that controls the switch 1306. When closed, the switch 1306 couples the modulated output signal 1318 from the N-bit modulator 1302 to the transmitter antenna 1308. The control signal 1316 causes the switch 1306 to open when the control signal 1316 is high and to close when the control signal 1316 is low. When the switch 1306 is open, no signal is transmitted over the transmitter antenna 1308. When the switch 1306 is closed, the modulated output signal 1318 from the conventional modulator 1302 will be transmitted via the transmitter antenna 1308.

The above-described configuration of the transmitter portion 1302 has the effect of dividing the transmission pulse time $T_b$ into two parts. During the first part of the pulse time $T_b$, bits 1–N of the N+1 bits to be transmitted are transmitted in accordance with a given digital modulation technique. The shape of the signal transmitted during the second part of the pulse time $T_b$ is then determined based on the value of the N+1 bit to be transmitted 1312. For example, if the N+1 bit to be transmitted 1312 is a zero, then the shape of the transmitted signal during the second part of the pulse time $T_b$ will be the same as the signal transmitted during the first part of the pulse time $T_b$. That is to say, if the value of the N+1 bit to be transmitted 1312 is zero, then the shape of the transmitted signal is held constant throughout the first and second parts of the pulse time $T_b$. However, if the value of the second bit to be transmitted 1312 is a one, then the switch 1306 will be open during the second part of the pulse time $T_b$ and the transmitted signal during the second part of the pulse time $T_b$ will be forced to zero.

Figure 14:
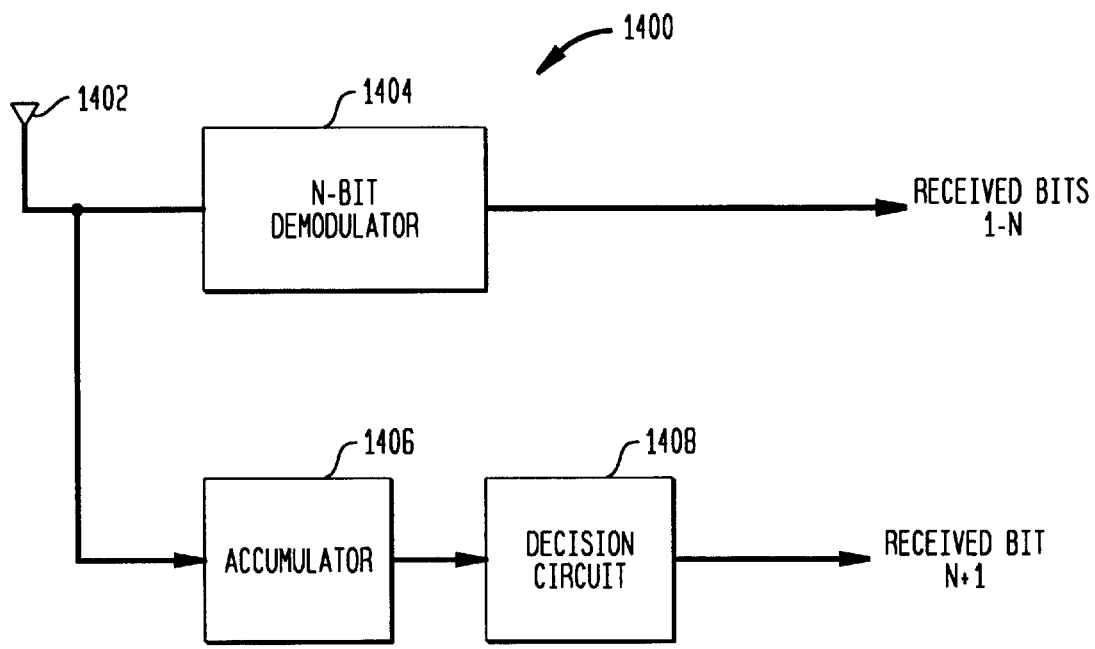
FIG. 14 is a functional diagram of the receiver portion of a modulation/demodulation system in accordance with an embodiment of the present invention.

FIG. 14 is a functional block diagram of the receiver portion 1400 of a modulation demodulation system in accordance with the present invention. The receiver portion 1400 receives the transmitted signal from a transmitter portion in accordance with the present invention, such as transmitter portion 1100 described above in regard to FIG. 11, and demodulates the signal to recover N+1 bits per pulse time $T_b$.

The receiver portion 1400 includes a receiver antenna 1402, an N-bit demodulator 1404, an accumulator 1406, and a decision circuit 1408.

The receiver antenna 1402 receives a transmitted signal carrying N+1 bits per pulse time $T_b$. The N-bit demodulator 1404 operates during a first part of the pulse time $T_b$ to recover received bits 1–N according to a digital demodulation technique. In embodiments, the N-bit demodulator 1404 comprises a conventional modulator for demodulating N bits according to a conventional digital demodulation technique such as, but not limited to, a BPSK, M-ary PSK, QAM, 16-QAM or 64-QAM digital demodulation technique.

During the second part of the pulse time $T_b$, the accumulator 1406 accumulates the charge from the signal received via receiver antenna 1402 and provides the accumulated voltage to the decision circuit 1408 which assigns a value to the received bit N+1 based on the value of the accumulated voltage. In accordance with this embodiment of the present invention, an accumulated voltage of zero, or very close to zero, will indicate a N+1 received bit of one, while an accumulated voltage above a first predetermined threshold voltage or below a second predetermined threshold voltage will indicate a N+1 received bit of zero.

Figure 15:
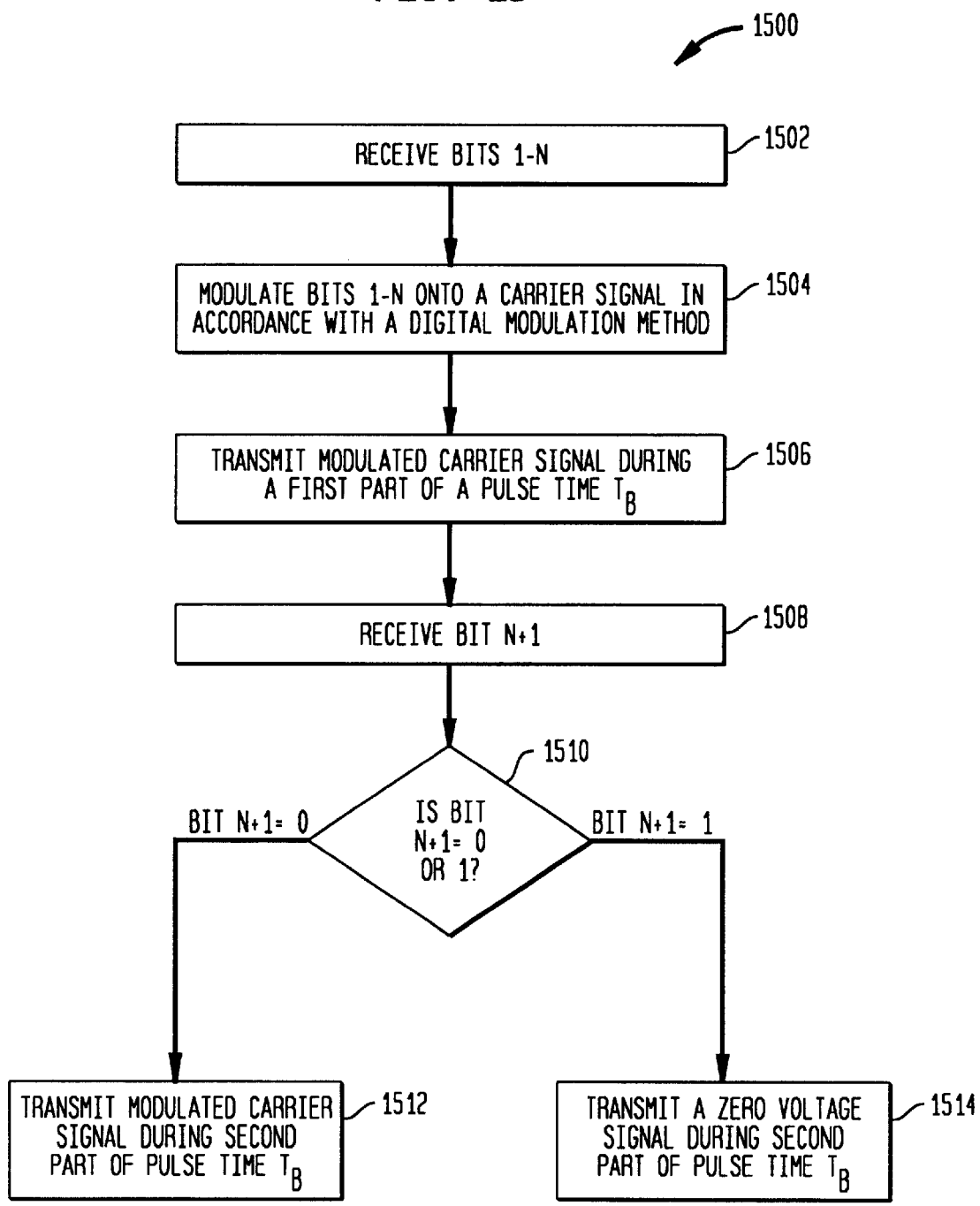
FIG. 15 is a flowchart of a method for modulating digital information in accordance with an embodiment of the present invention.

FIG. 15 is a flowchart of a method 1500 for modulating digital information in accordance with the present invention. The invention, however, is not limited to the description provided by the flowchart 1500. Rather, it will be apparent to persons skilled in the art from the teachings herein that other functional flows are within the scope and spirit of the present invention.

At step 1502, bit 1 through bit N are received. At step 1504, bits 1–N are modulated onto a carrier signal in accordance with a digital modulation technique. In embodiments, bits 1–N are modulated onto a carrier signal in accordance with a conventional digital modulation technique such as, but not limited to, a BPSK, M-ary PSK, QAM, 16-QAM or 64-QAM digital modulation technique. As shown at step 1506, the modulated carrier signal is then transmitted during the first part of a pulse time $T_B$.

At step 1508, bit N+1 is received. At step 1510, bit N+1 is tested to see if it is a one or a zero. If bit N+1 is a zero, then the modulated carrier signal is again transmitted during the second part of the pulse time $T_B$ as shown at step 1512. However, if bit N+1 is a one, then a zero voltage signal is transmitted during the second part of the pulse time $T_B$ as shown at step 1514.

In an alternate embodiment of the method shown in FIG. 15, if bit N+1 is a zero, then a zero voltage signal is transmitted during the second part of the pulse time $T_B$, and if bit N+1 is one, then the modulated carrier signal is again transmitted during the second part of the pulse time $T_B$.

Figure 16:
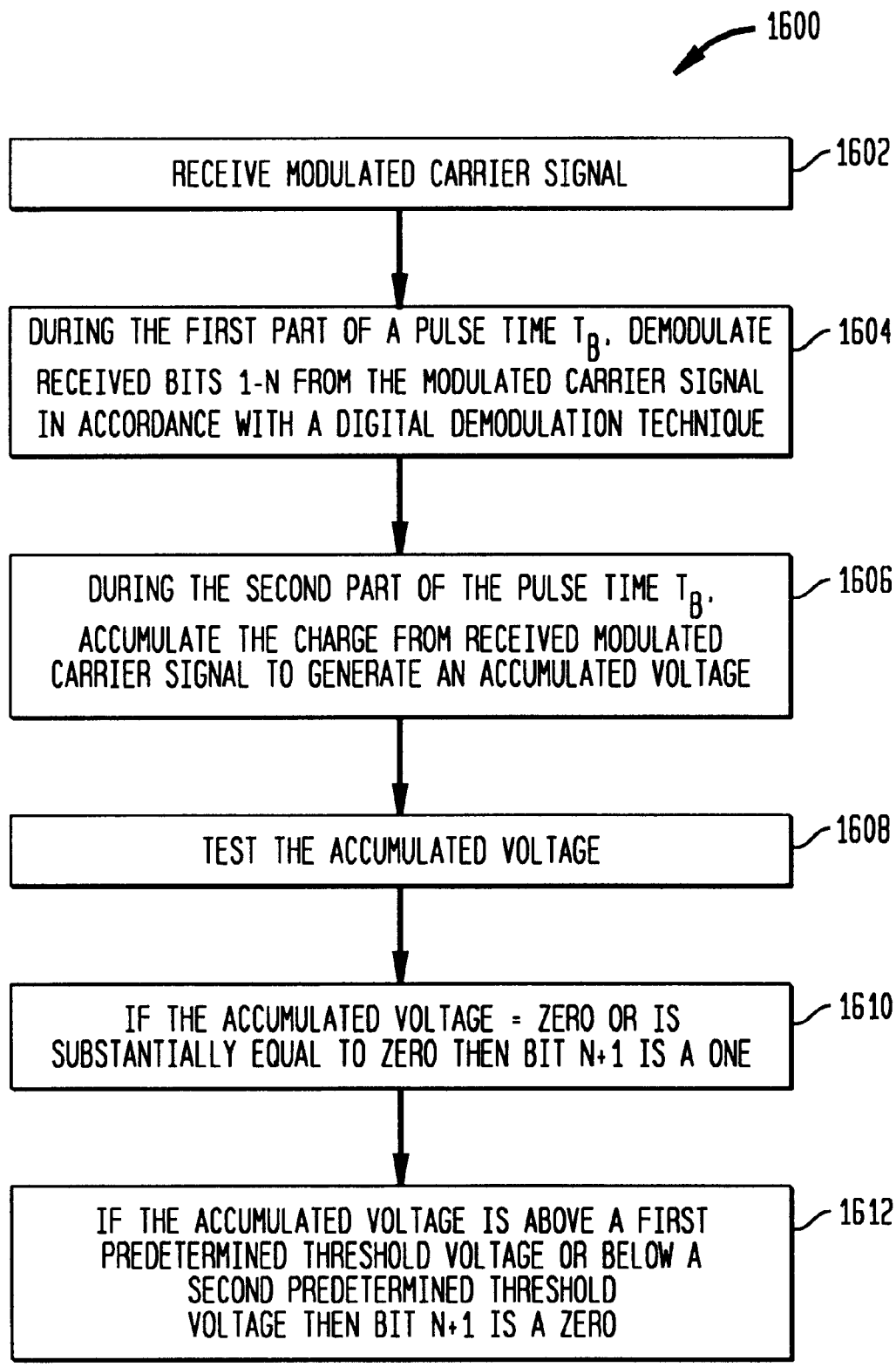
FIG. 16 is a flowchart of a method for demodulating digital information in accordance with an embodiment of the present invention.

FIG. 16 is a flowchart of a method 1600 for demodulating digital information in accordance with the present invention. The invention, however, is not limited to the description provided by the flowchart 1600. Rather, it will be apparent to persons skilled in the art from the teachings herein that other functional flows are within the scope and spirit of the present invention.

At step 1602, a modulated carrier signal carrying bit 1 through bit N+1 is received.

At step 1604, during the first part of a pulse time $T_B$, the modulated carrier signal is demodulated in accordance with a digital demodulation technique to recover received bit 1 through bit N. In embodiments, the modulated carrier signal is demodulated in accordance with a conventional digital demodulation technique to recover received bit 1 through bit N such as, but not limited to, a BPSK, M-ary PSK, QAM, 16-QAM or 64-QAM digital demodulation technique.

At step 1606, during the second part of the pulse time $T_B$, the charge from the received modulated carrier signal is accumulated to generate an accumulated voltage.

At step 1608, the accumulated voltage is tested. As shown at step 1610, if the accumulated voltage is equal to zero, or substantially equal to zero, then bit N+1 is determined to be a one. However, as shown at step 1612, if the accumulated voltage is above a first predetermined threshold voltage or below a second predetermined threshold voltage then bit N+1 is determined to be a zero.

In an alternate embodiment of the method shown in FIG. 16, if the accumulated voltage is equal to zero, or substantially equal to zero, then bit N+1 is determined to be a zero and if the accumulated voltage is above a first predetermined threshold voltage or below a second predetermined threshold voltage then bit N+1 is determined to be a one.

E. CONCLUSION

While various embodiments of the present invention have been described above, it should be understood that they have been presented by way of example only, and not limitation. For example, although the above embodiments are described in reference to a modulation/demodulation system for wireless transmission, it will be apparent to those skilled in the relevant art(s) that the present invention may be applied in any system that performs digital modulation and/or digital demodulation, including both wired and wireless systems. For instance, the present invention may be implemented in digital modems that connect computers to the Internet over wires such as phone lines or cable lines.

It will be further understood by those skilled in the art that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for transmitting digital information, comprising:

receiving one or more bits;

modulating said one or more bits onto a carrier signal to generate a first transmission signal;

transmitting said first transmission signal during a first part of a pulse time $T_B$;

receiving an additional bit;

determining whether said additional bit is a first value or a second value;

transmitting said first transmission signal during a second part of said pulse time $T_B$ if said additional bit is said first value; and transmitting a second transmission signal, wherein said second transmission signal is a voltage signal substantially equals to zero volt, during said second part of said pulse $T_B$ if said additional bit is said second value.

2. The method of claim 1, wherein said first value is zero and said second value is one.

3. The method of claim 1, wherein said first value is one and said second value is zero.

4. The method of claim 1, wherein modulating comprises:

modulating said one or more bits onto said carrier signal in accordance with a modulation technique to generate said first transmission signal, wherein said modulation technique is a phase shift keying modulation technique or a quadrature amplitude modulation technique.

5. A method for receiving digital information comprising:

receiving a transmission signal;

demodulating said transmission signal during a first part of a pulse time $T_B$ to determine a value for one or more received bits;

accumulating a voltage from said transmission signal during a second part of said pulse time $T_B$ to generate an accumulated voltage;

measuring said accumulated voltage;

assigning a first value to an additional received bit if said accumulated voltage is within a first voltage range, said first voltage range comprising voltages substantially equal to zero; and assigning a second value to said additional received bit if said accumulated voltage is within a second voltage range.

6. The method of claim 5, wherein said first value is a zero and said second value is a one.

7. The method of claim 5, wherein said first value is a one and said second value is a zero.

8. The method of claim 5, wherein said second voltage range comprises a voltage greater than A/4 volts or less than −A/4 volts, wherein A is the maximum value of said transmission signal and −A is the minimum value of said transmission signal.

9. The method of claim 5, wherein demodulating comprises:

demodulating said transmission signal in accordance with a demodulation technique during said first part of said pulse time $T_B$ to determine a value for said one or more received bits, wherein said demodulation technique is a phase shift keying demodulation technique or a quadrature amplitude demodulation technique.

10. A method for transmitting and receiving digital information, comprising:

modulating one or more bits onto a carrier signal to generate a first transmission signal;

transmitting said first transmission signal during a first part of a first pulse time $T_B$;

determining whether an additional bit is a first bit value or a second bit value;

transmitting a second transmission signal during a second part of said first pulse time $T_B$, wherein said second transmission signal is the same as said first transmission signal if said additional bit is said first value, and wherein second transmission signal is a voltage signal substantially equals to zero volt if said additional bit is said second value;

receiving said first and second transmission signals;

demodulating said first transmission signal during a first part of a second pulse time $T_B$ to determine a value for one or more received bits;

accumulating a voltage from said second transmission signal during a second part of said second pulse time $T_B$ to generate an accumulated voltage;

measuring said accumulated voltage;

assigning a first received value to an additional received bit if said accumulated voltage is within a first voltage range comprising voltages substantially equal to zero; and assigning a second received value to said additional received bit if said accumulated voltage is within a second voltage range.

11. A transmitter for transmitting digital information, comprising:
- a modulator for receiving one or more bits and modulating said one or more bits onto a carrier signal to generate a first transmission signal;
- control logic for receiving an additional bit and determining whether said additional bit is a first value or a second value;
- a transmitter antenna; and
- a switch;
- wherein said switch is controlled by said control logic to couple said first transmission signal to said transmitter antenna during a first part of a pulse time $T_B$, and wherein said switch is controlled by said control logic to couple said first transmission signal to said transmitter antenna during a second part of said pulse time $T_B$ when said additional bit is said first value and to couple a second transmission signal, wherein said second transmission signal is a voltage signal substantially equals to zero volt, to said transmitter antenna during said second part of said pulse time $T_B$ when said additional bit is said second value.

12. The transmitter of claim 11, wherein said control logic comprises an AND gate.

13. The transmitter of claim 11, wherein said first value is one and said second value is zero.

14. The transmitter of claim 11, wherein said first value is zero and said second value is one.

15. The transmitter of claim 11, wherein said modulator comprises a phase shift keying modulator or a quadrature amplitude modulator.

16. A receiver for receiving digital information, comprising:
- a receiver antenna for receiving a transmission signal;
- a demodulator for demodulating said transmission signal during a first part of a pulse time $T_B$ to determine a value for one or more received bits;
- an accumulator for accumulating a voltage from said transmission signal during a second part of said pulse time $T_B$ to generate an accumulated voltage; and
- a decision circuit for measuring said accumulated voltage;
- wherein said decision circuit assigns a first value to an additional received bit if said accumulated voltage is within a first voltage range comprising voltages substantially equal to zero and assigns a second value to said additional received bit if said accumulated voltage is within a second voltage range.

17. The receiver of claim 16, wherein said accumulator comprises a capacitor and a resistor.

18. The receiver of claim 16, wherein said first value is a zero and said second value is a one.

19. The receiver of claim 16, wherein said first value is a one and said second value is a zero.

20. The receiver of claim 16, wherein said second voltage range comprises a voltage greater than A/4 volts or less than −A/4 volts, wherein A is the maximum value of said transmission signal and −A is the minimum value of said transmission signal.

21. The receiver of claim 16, wherein said demodulator is a phase shift keying demodulator or a quadrature amplitude demodulator.

22. A system for communicating digital information comprising:
- (a) a transmitter portion, comprising:
  - (1) a modulator for modulating one or more bits onto a carrier signal to generate a first transmission signal,
  - (2) control logic for determining whether an additional bit is a first bit value or a second bit value;
  - (3) a transmitter antenna; and
  - (4) a switch, wherein said switch is controlled by said control logic to couple said first transmission signal to said transmitter antenna during a first part of a first pulse time $T_B$, and wherein said switch is controlled by said control logic to couple a second transmission signal to said transmitter antenna during a second part of said first pulse time $T_B$, wherein said second transmission signal is the same as said first transmission signal if said additional bit is said first value, and wherein said second transmission signal is a voltage signal substantially equals to zero volt if said additional bit is said second value; and
- (b) a receiver portion comprising:
  - (1) a receiver antenna for receiving said first and second transmission signals;
  - (2) a demodulator for demodulating said first transmission signal during a first part of a second pulse time $T_B$ to determine a value for one or more received bits;
  - (3) an accumulator for accumulating a voltage from said second transmission signal during a second part of said second pulse time $T_B$ to generate an accumulated voltage;
  - (4) a decision circuit for measuring said accumulated voltage, wherein said decision circuit assigns a first received value to an additional received bit if said accumulated voltage is within a first voltage range, said first voltage range comprising voltages substantially equal to zero, and assigns a second received value to said additional received bit if said accumulated voltage is within a second voltage range.

* * * * *

UNITED STATES PATENT AND TRADEMARK OFFICE
CERTIFICATE OF CORRECTION

PATENT NO. : 6,512,799 B2
DATED : January 28, 2003
INVENTOR(S) : Mazen Al-Khatib It is certified that error appears in the above-identified patent and that said Letters Patent is hereby corrected as shown below:

<u>Title page,</u>
Item [75], Inventors, name should be changed from
"Mazeb Al-Khatib" to -- Mazen Al-Khatib --

<u>Column 1,</u>
Line 30, "relate s" should be changed to -- relates --.

<u>Column 21,</u>
Line 56, "equals" should be changed to -- equal --.
Line 56, "volt" should be changed to -- volts --.

<u>Column 22,</u>
Line 49, after "wherein" the word -- said -- should be inserted.
Line 50, "equals" should be changed to -- equal --.
Line 50, "volt" should be changed to -- volts --.

<u>Column 23,</u>
Line 20, "equals" should be changed to -- equal --.
Line 20, "volt" should be changed to -- volts --.

<u>Column 24,</u>
Line 29, "equals" should be changed to -- equal --.
Line 29, "volt" should be changed to -- volts --.

Signed and Sealed this

Second Day of March, 2004

JON W. DUDAS
*Acting Director of the United States Patent and Trademark Office*